INVENTORS
SAMUEL E. GITHENS JR.
ROBERT K. BOOHER
BY A. M. Fernandez
ATTORNEY

*INVENTORS*
SAMUEL E. GITHENS JR
ROBERT K. BOOHER

BY A. M. Fernandez

ATTORNEY

INVENTORS
SAMUEL E. GITHENS JR.
ROBERT K. BOOHER
BY
A. M. Fernandez
ATTORNEY

INVENTORS
SAMUEL E. GITHENS JR.
ROBERT K. BOOHER
BY
A. M. Fernandez
ATTORNEY

May 9, 1967 S. E. GITHENS, JR., ET AL 3,319,057

PARALLEL DIVISION WITH SEPARATE CARRY STORAGE

Filed June 14, 1965 5 Sheets-Sheet 5

INVENTORS
SAMUEL E. GITHENS JR.
ROBERT K. BOOHER

BY A. M. Fernandez

ATTORNEY

United States Patent Office 3,319,057
Patented May 9, 1967

3,319,057

PARALLEL DIVISION WITH SEPARATE CARRY STORAGE

Samuel E. Githens, Jr., and Robert K. Booher, Downey, Calif., assignors to North American Aviation, Inc.

Filed June 14, 1965, Ser. No. 463,808
15 Claims. (Cl. 235—164)

This invention relates to a system for high speed division and more particularly to an improved system for a division with separate storage of carries.

Division, as usually performed in digital computers, is a recursive process consisting of successive trial subtractions of the divisor from successively lower orders of the dividend. With positive numbers, a binary one is generated in a corresponding order of the quotient each time the remainder is positive; if the remainder is negative, a binary zero is generated and the remainder is restored before the next trial subtraction.

To restore the remainder after a trial subtraction, the common practice is to add the divisor to the remainder in the next lower order thereby effectively restoring the remainder while at the same time executing the next trial subtraction. In that manner non-restoring division may be performed in a parallel computer as a sequence of additions and subtractions from successively lower orders of the dividend. Each iteration of the recursive routine consists of but one arithmetic operation followed by a shift operation. However, while the shift operation requires but one clock period, the arithmetic operation usually requires a number of clock periods for propagation of carries. In order that the number of clock periods for each iteration be held to a minimum, carry propagation must be completed in a very short period of time. Circuits capable of operating at as high a speed as one to ten megacycle clock rates will not perform the carry propagation function in a sufficiently short period of time as compared to the period required for other operations, particularly where, as in the usual case, the word length of the computer is from twenty to forty binary digits.

The speed of the arithmetic operations in the recursive routine for non-restoring division may be increased in a parallel computer by separately storing the carries instead of propagating them. In that manner, each remainder can be formed in one clock period. The separately stored carries produced during a given arithmetic operation of the recursive routine are assimilated during the next subsequent arithmetic operation. However, this creates problems in selecting the successive arthmetic operations, in generating the quotient digits and in detecting overflow because the sign of the remainder produced by each operation is not computed until the separately stored carries have been assimilated.

An object of this invention is to provide an improved method of performing division in a parallel digital computer.

Another object is to proivde an improved method of forming quotient digits in a system of division with unassimilated carries.

Another object is to provide an improved method of determining the nature of the operation to be performed during the next iteration of a recursive routine for division with unassimilated carries.

Still another object is to provide an improved method of forming a rounded quotient in a system of division with unassimilated carries.

Still another object is to provide an improved method of providing an adjusted remainder for a rounded quotient in a system of division with unassimilated carries.

Yet another object is to provide an improved method of detecting an overflow during arithmetic, left shift, and other operations in a system for division with unassimilated carries.

These and other objects are achieved in a parallel computer utilizing the conventional non-restoring method of division but with separate storage of carries for all orders of the remainders expressed as fractions. Three indicator digits placed to the left of the most significant binary digit are employed to store the sign and range of the accumulator because it is necessary for the accumulator to have a range of values X of $-2 \leqslant X < 1-2^{-n}$ for a number having $n$ digits during arithmetic operations with a separate storage of carries. After proper assimilation of the carries, each fraction X should lie in the range of $-1 \leqslant X < 1$. In accordance with the present invention, two indicator digits are employed to the left of the most significant binary digit in the accumulator in order to be able to store the sign and the range of values X in the accumulator of $-2 \leqslant X < 1-2^{-n}$ and a third indicator digit to detect overflow conditions during both arithmetic and left shift operations.

The divisor is first normalized by shifting it to the left until the first or most significant digit is a one for a positive number or a zero for a negative number since all negative numbers are expressed in the two's complement form. This may be accomplished in advance by either an automatic or a programmed routine. For proper division it is also necessary to scale the dividend to a value less than the divisor.

The successive arithmetic operations of the recursive routine for division are selected by examining the sign of the divisor and the sign of the dividend or partial remainder in the accumulator. In accordance with the present invention, that is accomplished by examining the sign and range indicator digits together with a predetermined number of the most significant digits of the accumulator wherein the carries of the remainder are separately stored. The operation selected during each iteration reduces the remainder sufficiently to maintain its absolute value equal to one-half the absolute value of the divisor, or less.

Each iteration consists of adding or subtracting the divisor, or adding zero. If a given operation selected is the subtraction of the divisor from the remainder in the accumulator, a pair of unassimilated quotient digits each equal to one are generated and stored as the corresponding pair of quotient digits. On the other hand, if a given operation is the addition of the divisor to the remainder in the accumulator, a pair of unassimilated quotient digits each equal to zero is generated and stored as the corresponding pair of quotient digits. Finally, when a given operation selected is the addition of zero to the accumulator a pair of quotient digits zero and one is generated and stored in the unassimilated form as the corresponding pair of quotient digits. This unique ternary code for the formation of the quotient allows the final assimilated quotient to be obtained by directly adding the pairs of quotient digits, allowing carries to be propagated.

Since the divisor has been normalized to be equal to or greater than one-half in magnitude, an "add zero" operation should not be performed when the remainder is greater in absolute value than one-half, the minimum possible value of the divisor at the time of the next trial subtraction. This can be assured if that portion of the accumulator examined to determine the next operation is great enough so that the remaining part not examined will have a possible value not greater than one-half. In general, the examination of the sign and range indicator digits will allow an "add zero" operation only when, upon examining the most significant part of the accumulator, the sign of the remainder cannot be determined and in these cases the magnitude of the remainder is founded by one-half.

us the decision of whether to generate a pair of quotient ;its [0,0] or [1,1] may be postponed until the partial nainder is shifted to the left a sufficient number of ıes to be able to determine the sign of the accumulator order to know that the next operation should be to d or subtract the divisor. In the meantime, for each dd zero" operation, a pair of quotient digits [1,0] is nerated.

In the preferred embodiment of the invention wherein rries are stored separately, five significant digits of the amined to reduce the range in which the sign of the cumulator is uncertain to less than 1/4 after the remain- r is shifted to the left relative to the divisor for the xt trial substraction. On position less is needed if ex- nination is postponed until after the remainder has been ifted. However, for ease in mechanization, the exami- ıtion should be made before, or while the shift operation being executed.

After the last recursive operation of adding, substract- g, or "adding zero" has been completed, one additional peration is performed and two additional pair of quotient gits are determined, one pair corresponding to the addi- onal operation, another pair corresponding to the next peration which would have been performed if division ere to be carried out still further.

Upon assimilating the quotient digits thus produced, ırries from the addition of the two additional pair of uotient digits are effectively added in the least significant igit position for a rounded quotient. In addition, a bi- ary one is added in the least significant digit position of ıe final quotient if, upon adding the two additional pairs f less significant quotient digits, a binary one would occur ı the most significant position of the sum of the two dditional pair of quotient digits. If both a sum and a arry are produced in the most significant position of the wo additional pair of quotient digits, a binary 2 is added o the quotient for rounding. The remainder is adjusted o it is in agreement with the rounded quotient such that he quotient multiplied by the divisor is exactly equal to he dividend less the remainder.

Throughout the operations of the recursive process just riefly described, the three sign and range indicator digits ıre monitored for an indication of an overflow condition.

The novel features which the applicants regard to be heir invention, together with further objects and advan- ages, will be better understood from the following de- cription to be considered in connection with the accom- panying drawings which are provided for the purpose of llustration and description only, not as a definition of the imits of the invention as defined by the claims appended ıereto.

A brief description of the operation of a computer in which the illustrative example of the invention is imple- mented will facilitate understanding the principles in- volved. The arithmetic unit illustrated in FIGURE 1 contains an accumulator comprising an A-register $A_1$ to $A_{29}$, a C-register $C_1$ to $C_{29}$, sign and range indicators $A_{30}$, $A_{31}$, $A_{32}$ and an unassimilated carry adder 10. An M-reg- ister $M_1$ to $M_{30}$ is provided to communicate with a memory not shown in FIGURE 1. Also included in the arithmetic unit is a Q-register $Q_1$ to $Q_{30}$ and an I-register $I_1$ to $I_{30}$. The Q-register is an auxiliary arithmetic register and the I-register is normally employed as the instruction register.

During division, after the instruction to divide has been decoded, the Q and I-registers are employed to store the quotient digits as they are generated in pairs by unique Quotient Logic 20. The A and Q-registers initially store the dividend with the sign of the dividend in the indicator flip-flop $A_{30}$ and the most significant Q-register position $Q_{29}$ connected directly to the least significant A-register position $A_1$ for left shift operations during each iteration of the recursive routine.

The sign position $Q_{30}$ of the Q-register is not employed while the A and Q-registers store the dividend. However, when the last pair of quotient digits generated are shifted into the least significant bit positions $Q_1$ and $I_1$ of the Q and I-registers, the most significant pair of quotient digits are shifted from positions $Q_{29}$ and $I_{29}$ to positions $Q_{30}$ and $I_{30}$ of the Q and I-registers.

During an arithmetic operation of adding, substracting or "adding zero," the sum or difference after addition or substraction is stored in the A-register in the unassimilated form which is with the psuedo-sum digits in the A-register and carries stored in the C-register to be added to the contents of the A-register during the next arithmetic op- eration or upon assimilation as required.

When the recursive routine for division has been com- pleted, the quotient is stored in the Q and I-registers in an unassimilated form while the remainder is stored in the A and C-registers in an unassimilated form. If the remainder is desired, the quotient in the I and Q-registers is discarded and the remainder in the accumulator re- tained in the unassimilated form. However, if the quotient is desired, the remainder is discarded and the unassimilated quotient is transferred to the A and C- registers for assimilation. If both the quotient and the remainder are desired, the division is performed twice, once for the quotient and once for the remainder. The quotient is automatically rounded and the remainder is automatically adjusted to agree with the rounded quotient.

The M-register holds the divisor during division. As will be noted hereinafter, the M-register is also employed for all data transfers to the accumulator.

Figure 2:
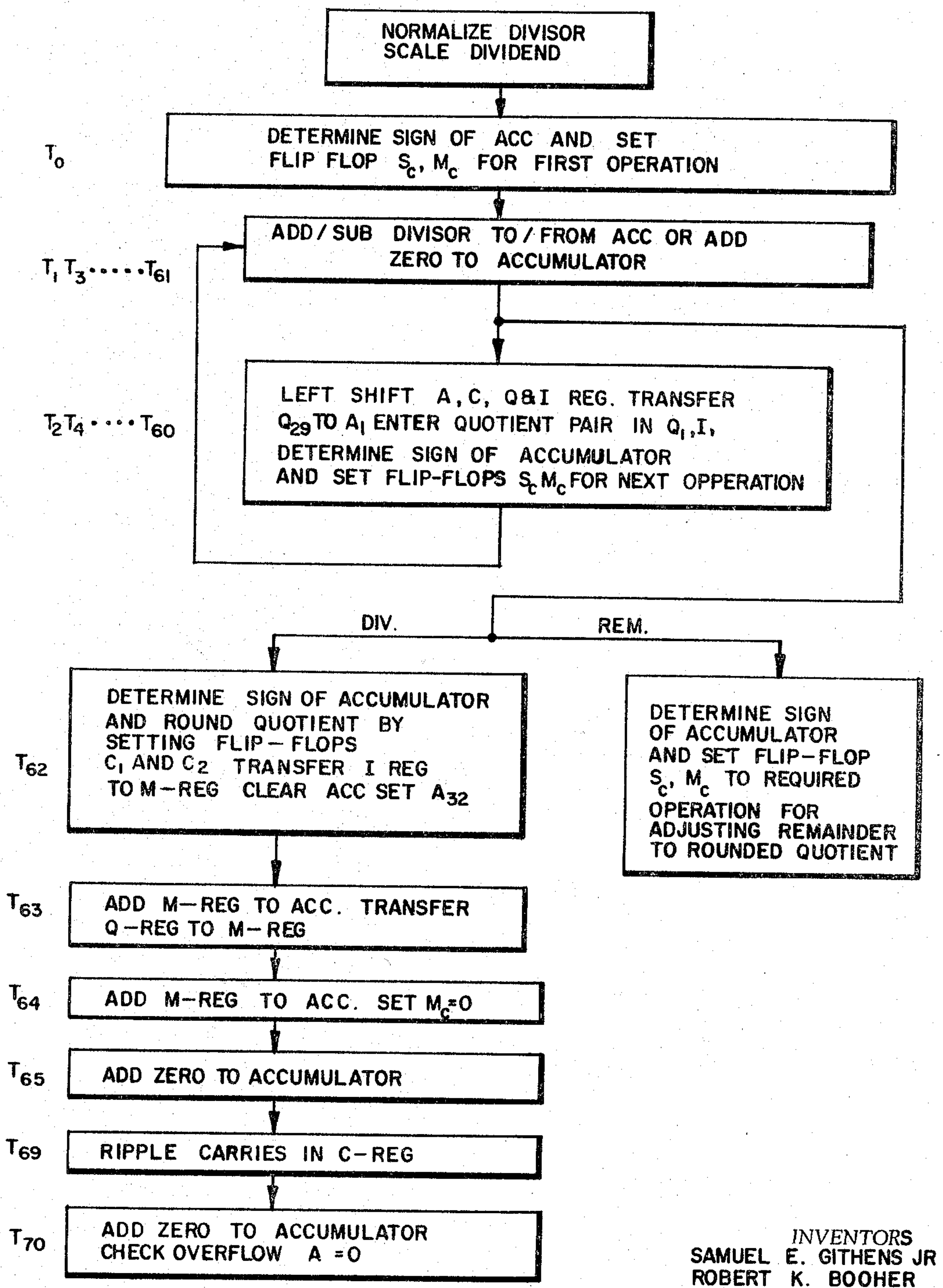
FIGURE 2 is a flow chart of the recursive process for ıon-restoring division with unassimilated carries.

The algorithm of the present invention illustrated in the flow diagram of FIGURE 2 is an extension of the conventional Van Neuman non-restoring method of division. This method will divide the contents of the A and Q-registers by a number selected from memory and placed in the M-register, leaving the quotient in an unassimilated form, namely a unique ternary code, in the Q and I-registers and the remainder in an unassimilated form in the accumulator comprising the A and C-registers at time $T_{61}$. Thereafter, if the instruction is to divide and obtain the quotient, identified by the mnemonic code DIV, the unassimilated quotient in the Q and I-registers is transferred to the accumulator and assimilated. On the other hand, if the instruction is to divide and obtain the remainder, identified by the mnemonic code REM, the remainder is retained in the accumulator in the un- assimilated form.

Assimilation of the remainder is accomplished by the next instruction if it is required such as an instruction to store the remainder in a memory location. Otherwise the remainder is retained in the unassimilated form for further processing such as for double precision division.

For the purpose of this invention, we assume that the dividend has already been placed in the A and Q-registers and that the divisor placed in the M-register has been normalized. The first step is to determine whether the divisor is greater than the dividend because if it is not the accumulator cannot hold the quotient and an overflow will result. Since negative numbers are represented in the two's complement form it is necessary to decide at time $T_0$ whether to add or subtract the divisor from the dividend so that the first partial remainder will be a measure of the absolute difference between the dividend and the divisor.

Before proceeding with a detailed description of the algorithm implemented in this invention, it will be helpful to first review the Van Neuman method in general. If the dividend and the divisor are of the same sign, the divisor is subtracted from the dividend as the first step of the general Van Neuman method. If the dividend and the divisor are of different signs, the divisor is added to the dividend to obtain the magnitude of their difference. The following table may be employed to determine which of the operands is the largest.

GENERAL SIGN AND OVERFLOW TABLE

| As | Ms | Op | Ri | Comparison | Ov | Qs |
|---|---|---|---|---|---|---|
| 0 | 0 | Sub | 0 | (A)>(M) | 1 | ------ |
| 0 | 1 | Add | 0 | (A)>(M) | 1 | ------ |
| 1 | 0 | Add | 0 | (A)<(M) | 0 | 1 |
| 1 | 1 | Sub | 0 | (A)<(M) | 0 | 0 |
| 0 | 0 | Sub | 1 | (A)<(M) | 0 | 0 |
| 0 | 1 | Add | 1 | (A)<(M) | 0 | 1 |
| 1 | 0 | Add | 1 | (A)>(M) | 1 | ------ |
| 1 | 1 | Sub | 1 | (A)>(M) | 1 | ------ |

The information in the first four columns can be determined by examining the sign A*s* of the dividend, the sign M*s* of the divisor, the operation performed and the sign R*i* of the first partial remainder. The information in the fifth column can then be deduced from the first four columns. If the dividend is greater than the divisor an overflow (O*v*=1) is indicated; if not, the sign Q*s* of the quotient indicated in the sixth column may be deduced. Thus it may be seen that the sign of the quotient will be negative if the sign of the remainder is the same as the sign of the divisor, and will be positive if the sign of the remainder is unlike the sign of the divisor.

After the second and subsequent arithmetic operations, the quotient digits are determined in the same manner as the first for the sign, and the divisor should be shifted to the right for the next operation; however, since that is not convenient, the same result is achieved by shifting the partial remainder to the left. The vacated position of the dividend registers are utilized to store the quotient digits. Thus, in the Van Neuman process, the quotient digits Q*i* are determined from the sign R*i* of the remainder keeping in mind the sign A*s* of the dividend, the sign M*s* of the divisor and the sign Q*s* of the quotient determined during the first arithmetic operation. The following table defines the quotient digits Q*i* in that manner.

QUOTIENT DIGIT TABLE

| Qs | Ms | As | Ri | A=Ri | Qi |
|---|---|---|---|---|---|
| 0 | 0 | 0 | 0 | Yes | 1 |
| 1 | 0 | 1 | 0 | No | 1 |
| 0 | 1 | 1 | 0 | No | 0 |
| 1 | 1 | 0 | 0 | Yes | 0 |
| 0 | 0 | 0 | 1 | No | 0 |
| 1 | 0 | 1 | 1 | Yes | 0 |
| 0 | 1 | 1 | 1 | Yes | 1 |
| 1 | 1 | 0 | 1 | No | 1 |

The fifth column is actually an indication of whether the last trial subtraction which produced the remainder R*i* "would go"; if not the quotient should be unaltered and the remainder restored. The quotient is altered by inserting a digit 1 for a positive quotient (Q*s*=0) and a digit 0 for a negative quotient (Q*s*=1). However, from that truth table we can state the more simple rule that the quotient digit is 1 if the sign R*i* of the remainder is the same as the sign M*s* of the divisor, and 0 if the sign of the remainder is unlike the sign of the divisor. This rule is the same as the rule for determining the sign of the quotient since a minus sign is represented by a digit 1 and a plus sign is represented by a digit 0. Accordingly, there is no distinction between the logic for determining the sign Q*s* of the quotient and the logic for determining the successive quotient digits Q*i*.

Figure 3:
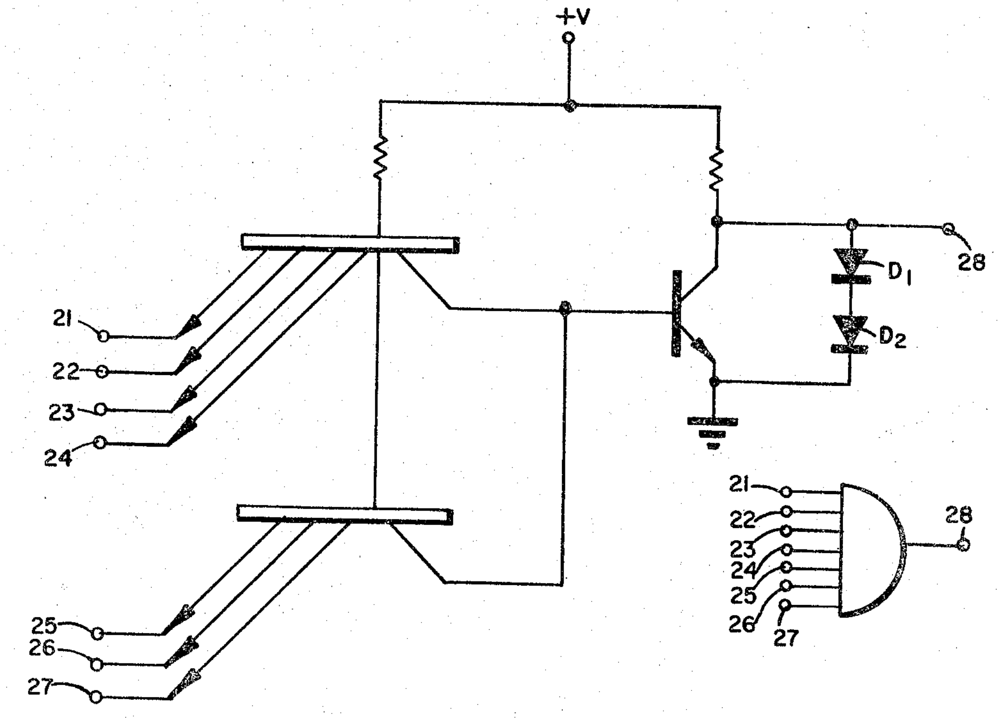
FIGURE 3 is a circuit diagram of a NAND-gate used in a preferred embodiment of the invention.

Before proceeding with a detailed description of the invention the circuit implementation of logic equations with NAND-gates will be described. FIGURE 3 illustrates a NAND-gate circuit selected to implement the invention because of its simplicity, high speed and low power requirements. Its operation is as follows. When any one of its input terminals 21 to 27 is at ground level (±.35 volt) the output terminal 28 is at a positive level (+1.75±.5 volts) which is equal to the sum of the voltage drops across two clamping diodes $D_1$ and $D_2$. Otherwise the output terminal 28 is at zero volts. Thus for the AND function all input signals must be true or equal to 1 (positive) and the output function is the complement of that AND function. Accordingly, if a true output of the AND function is desired, an inverter or complementing function must be added as by a cascaded NAND-gate.

Figure 4:
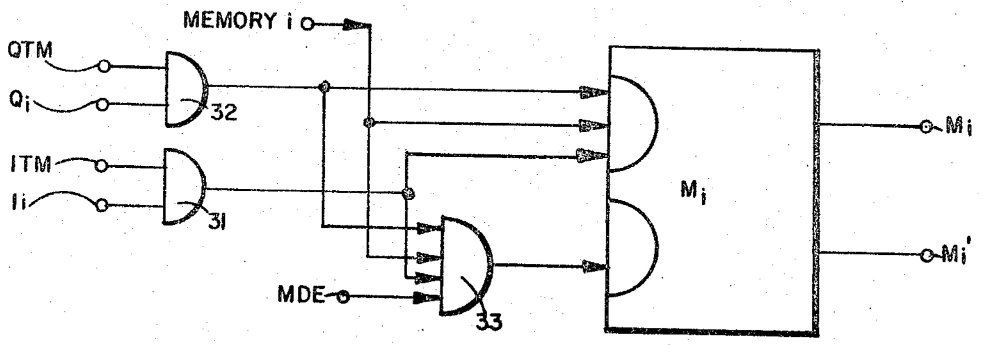
FIGURE 4 is a schematic diagram illustrating the man- ner in which NAND-gates are employed to implement the logic design of the preferred embodiment of the invention.

FIGURE 4 illustrates the use of NAND-gates to implement typical logic equations for the control of a flip-flop M*i* in the M-register. The set and reset equations are as follows:

$${}_1M_1=Q_1QTM=I_1ITM+\text{MEMORY}_1$$
$${}_0M_1=(Q_1QTM)'(I_1ITM)'MDE$$

QTM and ITM are control terms for the transfer of the contents of the Q and I-registers, respectively, to the M-register. All control terms are generated by a Sequence Control Logic 30 (FIGURE 1) at specified clock times. Thus ITM includes a clock pulse $T_{62}$ and QTM includes a clock pulse $T_{63}$. If, upon transferring the content of the I-register at time $T_{62}$, the corresponding flip-flop $I_1$ is true, the NAND-gate 31 (FIGURE 4) is enabled and the flip-flop $M_1$ is set. Another NAND-gate 32 is provided for the parallel transfer of the content of the Q-register to the M-register. Thus, if $Q_1$ is true, the flip-flop $M_1$ is set under the control of a signal QTM for transfer of the contents of the Q-register to the M-register at time $T_{63}$. The Sequence Control Logic 30 generates another control signal IDE to enable a zero-set NAND-gate 33 when either one of the control signals QTM or ITM is generated. For instance, during a transfer of the content of the Q-register to the M-register, both signals QTM and IDE are generated. If the signal $Q_1$ is false, the NAND-gate 32 is not enabled. Owing to the inherent complementing function of the NAND-gate 32, the output to a NAND-gate 33 is then true and the flip-flop $M_1$ is set false. In that manner one NAND-gate is employed for all reset functions instead of one NAND-gate for each reset function. In other words, the function of the NAND-gate 33 is equal to the following logic:

$${}_0M_1=Q_1'QTM+I_1'ITM+\text{MEMORY}_1'$$

which would require two NAND-gates at the same level as the NAND-gates 31 and 32. It should be noted that each side of the flip-flop $M_1$ includes an integral input NAND-gate which, for the true-set logic in this example, provides the OR functions indicated.

In the present invention, the first unassimilated carry function or operation is the process of adding or subtracting the divisor from the dividend and the partial remainders; the second is shifting the partial remainders. Both are repeated 30 times for a 30-bit quotient including the sign. The arithmetic operations are performed during the odd bits times $T_1$, $T_3$, $T_5$ . . . $T_{59}$ and the shift operations are performed during the even bit times $T_2$, $T_4$, $T_6$ . . . $T_{60}$. After the 30th arithmetic operation the quotient is ready to be rounded. To determine whether the quotient needs to be rounded by adding a binary 1, and in one instance a binary 2, another arithmetic operation is performed at $T_{61}$ for an additional ial subtraction but the resulting remainder is not thereter shifted to the left at time $T_{62}$. After that addional arithmetic operation, an additional (31st) pair of lotient digits is determined but not stored at time $T_{62}$. istead, the sign of the accumulator is examined in order determine still another (32nd) pair of quotient digits ld, based upon both additional pair of quotient digits, e quotient is rounded. In each case, the remainder is ljusted if it is to be retained so that it is in agreement ith the rounded quotient. The following table will asst in understanding the nature of the rounding function ld the adjustment required in the remainder.

TABLE FOR ROUNDING QUOTIENT AND ADJUSTING REMAINDER

| $T_{61}$ | | | $T_{62}$ | | | $T_{62}$ | $T_{63}$ |
|---|---|---|---|---|---|---|---|
| Op | $Q_{(31)}$ | $I_{(31)}$ | Op | $Q_{(32)}$ | $I_{(32)}$ | Round | Adjust Remainder |
| +M | 0 | 0 | +M | 0 | 0 | +0 | +M |
| +M | 0 | 0 | −M | 1 | 1 | +1 | −M |
| −M | 1 | 1 | +M | 0 | 0 | +1 | +M |
| −M | 1 | 1 | −M | 1 | 1 | +2 | −M |
| +0 | 0 | 1 | +M | 0 | 0 | +1 | +0 |
| +0 | 1 | 0 | −M | 1 | 1 | +1 | +0 |
| +0 | 0 | 1 | +0 | 0 | 1 | +1 | +0 |
| +M | 0 | 0 | +0 | 0 | 1 | +1 | −M |
| −M | 1 | 1 | +0 | 0 | 1 | +1 | +M |

In the first six cases, the determination to round the quotient by adding binary 0, 1 or 2 is made without regard to the nature of still another (33rd) pair of quotient ligits since they would have no effect on the rounded quotient when the quotient is assimilated by adding the content of the I-register to the content of the Q-regstor. The same is true of the seventh case. In the eighth and ninth cases, however, if the 33rd pair of quotient digits were to be $Q_{(33)}=1$ and $I_{(33)}=1$, the result would be different. In the ninth case, the quotient should be rounded by adding binary 2 instead of binary 1, and in the eighth case, the quotient should be rounded by adding zero instead of binary 1. The choice selected in those two doubtful cases is to add binary 1 in each, thereby having a possible error of $2^{-30}$ too little in the ninth case and $2^{-30}$ too muc in the eighth case. However, the error which may occur in a given case is insignificant, and the average error is zero.

To determine the adjustment of the remainder, the usual rule may be followed of performing the same operation at time $T_{63}$ as at time $T_{61}$ if the quotient digit pairs are alike, and the opposite operation if they are not alike, *provided* neither operation was "add zero." If the first operation at time $T_{61}$ was "add zero," the operation of time $T_{63}$ should also be "add zero," but if the first operation at time $T_{61}$ is not "add zero," as in the eighth and ninth cases, the last operation at time $T_{63}$ should be opposite that at time $T_{61}$. It should be noted that the operation indicated at time $T_{62}$ is not executed so that in the eighth and ninth cases, the operations indicated for adjustment of the remainder are the same as corresponding operations for the respective second and third cases which they resemble. Thus the remainder is in agreement with the rounded quotient in every case.

Since the adder 10 (FIGURE 1) operates in the unassimilated mode, there exists an uncertainty in the sign of each partial remainder. This uncertainty creates problems in determining the operation sequence and quotient formation. To solve these problems, overflow logic 40 is provided to determine the sign and range of the partial remainders for overflow detection. Thus, special indicator digits $A_{32}$, $A_{31}$, $A_{30}$ and associated logic 40 provide a consistent sign representation for the accumulator and overflow analysis for all arithmetic and shift operations.

The arithmetic operations are to add or subtract, depending upon the signs of the divisor and the partial remainder. However, when the sign of the accumulator cannot be determined, which is sometimes the case since the carries from the last arithmetic operation have not been assimilated, an "add zero" operation is performed. Since an "add zero" operation is to be performed when the sign of the accumulator cannot be determined, it is necessary to insure that such an "add zero" operation is not permitted when the absolute value of the accumulator is greater than the absolute value of the divisor at an odd bit time. Because the divisor has been normalized to be equal to or greater than $|\frac{1}{2}|$, it is known that an "add zero" operation should not be performed when the accumulator is greater in absolute value than the minimum absolute value of the divisor which is ½. As noted hereinbefore, this can be assured if that portion of the accumulator examined to determine the sign of the accumulator by inspection is great enough so that the remaining part not examined will have a possible absolute value at an odd bit time not greater than the minimum possible absolute value for the divisor before the next trial subtraction. Thus, upon examination of the sign and some of the most significant binary digits of the accumulator, the apparatus of the present invention will allow an "add zero" operation only when it is determined that the remainder is within a certain range. ADD/SUB Control Logic 50 makes that determination.

As noted hereinbefore, three indicator digits $A_{32}$, $A_{31}$ and $A_{30}$ are provided to store the sign and range of the accumulator. The A and C-registers have been organized such that the value of the accumulator Acc. during the unassimilated mode of operation is represented by $$\text{Acc.}=-A_{32}2^{+2}-A_{31}2^{+1}+A_{30}2^{0}+(A_{29}+C_{29})2^{-1}+\ldots(A_1+C_1)2^{-29}$$

The following table indicates the functions of the A and C-registers during arithmetic operations.

TABLE FOR ADDITION

| Time $T_n$ | | | Time $T_{n+1}$ | |
|---|---|---|---|---|
| $A_i$ | $b_0$ | $C_i$ | $A_i$ | $C_{i+1}$ |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

where $b_i=M_iScMc+M_i'Sc'Mc$ $b_i'=M_i'ScMc+M_iSc'Mc+Mc'$

*Sc* is a control term to add

*Sc'* is a control term to subtract

*Mc* is a control term to add or subtract $M_i$

The *Sc* and *Mc* control signals are derived from flipflops (FIGURE 1) identified by the same symbols *Sc* and *Mc*. Their function may be more fully understood from the following table.

TABLE FOR ADD/SUB CONTROL

| Sc | Mc | Operation |
|---|---|---|
| 1 | 0 | Add zero. |
| 1 | 1 | Add the contents of the M-register. |
| 0 | 1 | Subtract the contents of the M-register. |

It should be noted that subtraction is performed by adding the two's complement of the subtrahend.

The functions of the indicator digits and the resultant range of the accumulator after an arithmetic operation are indicated by the following table.

TABLE OF INDICATOR DIGITS FOR ARITHEMETIC OPERATIONS

| Time $T_n$ | | | | | Time $T_{n+1}$ | | | |
|---|---|---|---|---|---|---|---|---|
| (−1) $b_{30}$ | (−4) $A_{32}$ | (−2) $A_{31}$ | (+1) $A_{30}$ | (+1) $C_{30}$ | (−4) $A_{32}$ | (−2) $A_{31}$ | (+1) $A_{30}$ | Ov |
| 0 | 0 | 0 | 0 | 0 | 0 | 0 | 0 | ----- |
| 0 | 0 | 0 | 0 | 1 | 0 | 0 | 1 | ----- |
| 0 | 0 | 0 | 1 | 0 | 0 | 0 | 1 | ----- |
| 0 | 0 | 0 | 1 | 1 | 0 | 0 | 0 | 1 |
| 0 | 0 | 1 | 0 | 0 | 0 | 1 | 0 | ----- |
| 0 | 0 | 1 | 0 | 1 | 0 | 1 | 1 | ----- |
| 0 | 0 | 1 | 1 | 0 | 0 | 1 | 1 | ----- |
| 0 | 0 | 1 | 1 | 1 | 0 | 0 | 0 | ----- |
| 0 | 1 | 0 | 0 | 0 | 1 | 0 | 0 | x |
| 0 | 1 | 0 | 0 | 1 | 1 | 0 | 1 | ----- |
| 0 | 1 | 0 | 1 | 0 | 1 | 0 | 1 | ----- |
| 0 | 1 | 0 | 1 | 1 | 0 | 1 | 0 | ----- |
| 0 | 1 | 1 | 0 | 0 | 1 | 1 | 0 | x |
| 0 | 1 | 1 | 0 | 1 | 1 | 1 | 1 | x |
| 0 | 1 | 1 | 1 | 0 | 1 | 1 | 1 | x |
| 0 | 1 | 1 | 1 | 1 | 1 | 0 | 0 | x |
| 1 | 0 | 0 | 0 | 0 | 0 | 1 | 1 | ----- |
| 1 | 0 | 0 | 0 | 1 | 0 | 0 | 0 | ----- |
| 1 | 0 | 0 | 1 | 0 | 0 | 0 | 0 | ----- |
| 1 | 0 | 0 | 1 | 1 | 0 | 0 | 1 | ----- |
| 1 | 0 | 1 | 0 | 0 | 1 | 0 | 1 | ----- |
| 1 | 0 | 1 | 0 | 1 | 0 | 1 | 0 | ----- |
| 1 | 0 | 1 | 1 | 0 | 0 | 1 | 0 | ----- |
| 1 | 0 | 1 | 1 | 1 | 0 | 1 | 1 | ----- |
| 1 | 1 | 0 | 0 | 0 | 1 | 1 | 1 | x |
| 1 | 1 | 0 | 0 | 1 | 1 | 0 | 0 | x |
| 1 | 1 | 0 | 1 | 0 | 1 | 0 | 0 | 1 |
| 1 | 1 | 0 | 1 | 1 | 1 | 0 | 1 | ----- |
| 1 | 1 | 1 | 0 | 0 | 1 | 1 | 1 | x |
| 1 | 1 | 1 | 0 | 1 | 1 | 1 | 1 | x |
| 1 | 1 | 1 | 1 | 0 | 1 | 1 | 0 | x |
| 1 | 1 | 1 | 1 | 1 | 1 | 1 | 1 | x |

An "$x$" in the overflow column O$v$ indicates that an overflow condition is defined, but as explained hereinafter, those overflow conditions need not be detected; only those two overflow conditions indicated by digit 1 are detected. As noted hereinbefore, it is necessary for the accumulator to have a range of values $x$ of $$-2 \leqslant x < +1-2^{-29}$$

during the unassimilated carry mode of operation. This is necessary for proper storage of the unassimilated carries and for overflow analysis before carries are assimilated.

The flip-flops $A_{32}$, $A_{31}$ and $A_{30}$ are assigned the respective weighted values of −4, −2 and +1. The carry $C_{30}$ derived from $A_{29}$, $b_{29}$ and $C_{29}$ and added to the sign bit position $A_{30}$ is assigned the same weighted value as the sign bit positoin $A_{30}$. The addend digit $b_{30}$ derived from the sign of the multiplicand in bit position $M_{30}$ has a weighted value of −1 since a bit 1 in that position represents a negative member in the two's complement form. Thus at any time before assimilation of the carries, the extreme range of the number in the accumulator can be determined by examining the indicator digits. An overflow is detected if the algebraic sum of the weighted indicator digits exceed the range of values $x$ of $$-2 \leqslant x < +1-2^{-29}$$

In the foregoing table, all possible combinations of the digits $b_{30}$, $A_{32}$, $A_{31}$, $A_{30}$ and $C_{30}$ have been included; however, as just noted only two overflow conditions are of interest during an arithmetic operation as defined by the following overflow logic $${}_1Ov=b_{30}'A_{32}'A_{31}'A_{30}C_{30}ASC+b_{30}A_{32}A_{31}'A_{30}C_{30}'ASC$$

where $$C_{30}=A_{29}C_{29}+A_{29}b_{29}+C_{29}b_{29}$$
$$C_{30}'=(A_{29}C_{29}+A_{29}b_{29}+C_{29}b_{29})'$$

It is not necessary to mechanize an overflow detection for the other conditions during arithmetic operations indicated by the control term ASC since the value of the indicator digits for the other conditions is already outside the acceptable range by more than the sum of $A_{30}$, $b_{30}$ and $C_{30}$ and consequently overflow will already have been detected.

For the purpose of this invention it is assumed that the dividend has been stored in the A and C-registers before the initial time $T_0$. That may be accomplished by transferring the least significant half of the dividend directly into the Q-register in response to an instruction to load the Q-register from a specified memory location. The most significant half of the dividend is then stored in the accumulator in response to an instruction to clear the accumulator and add the contents of a specified memory location. The sign of the dividend is first read from memory into the flip-flop $M_{30}$ and then added to the accumulator according to the function $${}_1A_{30}=A_{30}'b_{30}C_{30}'ASC$$
$${}_1A_{31}=A_{31}'A_{30}'b_{30}C_{30}'ASC$$

In that manner the sign of the dividend is initially copied into both of the indicator flip-flops $A_{30}$ and $A_{31}$ to represent the sign and range value of $x$ of the dividend as $$-1 \leqslant x < 0$$

Assimilation of the carries in the C-register is performed automatically when required by the instruction being executed, such as by the instruction DIV noted hereinbefore or by the next instruction if the instruction being executed does not, such as the instruction REM for the remainder. The assimilation is accomplished in three phases as will be explained more fully hereinafter with reference to bit times $T_{65}$ to $T_{70}$ of the flow chart on FIGURE 2.

Complete implementation for operation of the unassimilated carry adder 10, the accumulator and a sign, range and overflow logic network 40, after initialization at time $T_0$, at which time the overflow flip-flop O$v$ is reset, is indicated by the following logic equations $${}_1A_1=A_1'C_1'b_1ASA+A_1'C_1b_1'ASA+Q_{29}QTM$$
$${}_0A_1=A_1C_1'b_1ASA+A_1C_1b_1'ASA+(Q_{29}QTM)'ADE$$
$${}_1A_i=A_i'C_i'b_iASA+A_i'C_ib_i'ASA+A_{i-1}LSA$$
$${}_0A_i=A_iC_i'b_iASA+A_iC_ib_i'ASA+(A_{i-1}LSA)'ADE$$
$${}_1A_{30}=A_{30}'b_{30}'C_{30}ASC+A_{30}'b_{30}C_{30}'ASC+A_{29}'C_{29}LSC+A_{29}C_{29}'LSC+A_{31}A_{30}'R_{30}T_{69}DIV+A_{31}'A_{30}'R_{30}T_{69}DIV$$
$${}_0A_{30}=A_{30}b_{30}'C_{30}ASC+A_{30}b_{30}C_{30}'ASC+A_{29}'C_{29}'LSC+(LSC)'ADE+A_{31}A_{30}R_{30}T_{69}DIV$$
$${}_1A_{31}=A_{31}'A_{30}'b_{30}C_{30}'ASC+A_{32}A_{31}'A_{30}b_{30}'C_{30}ASC+A_{32}A_{31}'A_{30}R_{30}T_{69}DIV+A_{31}'A_{30}T_{70}DIV$$
$${}_0A_{31}=A_{31}A_{30}b_{30}'C_{30}ASC+A_{32}'A_{31}A_{30}'b_{30}C_{30}'ASC+A_{30}'A_{29}'C_{29}LSC+A_{30}'A_{29}C_{29}'LSC+A_{30}A_{29}C_{29}LSC+(LSC)'ADE+A_{31}A_{30}R_{30}T_{69}DIV+A_{31}A_{30}'T_{70}DIV$$
$${}_1A_{32}=A_{32}'A_{31}A_{30}'b_{30}C_{30}'ASC+(A_{29}'+C_{29}')A_{31}A_{30}'LSC+I_{30}Q_{30}'T_{62}DIV$$
$${}_0A_{32}=A_{31}'A_{30}b_{30}'C_{30}ASC+(LSC)'(I_{30}Q_{30}'T_{62}DIV)'ADE+T_{70}DIV$$
$$b_i=M_iScMc+M_i'Sc'Mc$$
$$b_i'=M_i'ScMc+M_iSc'Mc+Mc'$$
$${}_1C_1=Sc'McASC+Sc({}_0Sc)T_{62}DIV+Mc'T_{62}DIV+({}_0Mc)T_{62}DIV$$
$${}_0C_1=ScASC+Sc'Mc({}_0Sc)T_{62}DIV+(T_{62}DIV)'(ASC)'CDE$$
$${}_1C_2=A_1C_1ASC+A_1b_1ASC+C_1b_1ASC+C_1LSC+Sc'Mc({}_0Sc)T_{62}DIV+R_1T_{69}DIV$$
$${}_0C_2=(A_1C_1ASC)'(A_1b_1ASC)'(C_1b_1ASC)'(C_1LSC)'+(Sc'Mc({}_0Sc)T_{62}DIV)'CDE$$
$${}_1C_{i+1}=A_iC_iASC+A_ib_iASC+C_ib_iASC+C_iLSC+R_iT_{69}DIV$$
$${}_0C_{i+1}=(A_iC_iASC)'(A_ib_iASC)'(C_ib_iASC)'(C_iLSC)'CDE$$
$$C_{30}=A_{29}C_{29}+A_{29}b_{29}+C_{29}b_{29}$$
$$C_{30}'=(A_{29}C_{29}+A_{29}b_{29}+C_{29}b_{29})'$$
$${}_1Ov=A_{32}'A_{31}'A_{30}b_{30}'C_{30}ASC+A_{32}A_{31}'A_{30}b_{30}C_{30}'ASC$$

$$+A_{32}'A_{31}A_{30}T_{70}$$
$$+A_{32}'A_{31}'A_{30}'T_{70}$$
$$+A_{32}LSC+A_{31}A_{30}'A_{29}'C_{29}'LSC+A_{31}'A_{30}LSC$$
$$+A_{31}'A_{29}C_{29}LSC$$

where:

$A_i$—ith stage of the A-register $C_i$—ith stage of the C-register $M_i$—ith stage of the M-register $Q_i$—ith stage of the Q-register $I_i$—ith stage of the I-register Sc—sign control flip-flop, used to control addition and subtraction at a given time ${}_0Sc$—sign control flip-flop input used to zero-set it at a given time Mc—magnitude control flip-flop, used to control magnitude of inputs to adders, the adder 10, either the contents of the M-register or zero for an "add zero" operation, at a given time ${}_0Mc$—magnitude control flip-flop input used to zero-set it at a given time $b_i$—inputs to adder, controlled by Sc and Mc Ov—overflow indicator flip-flop In the foregoing equations, and others to be described, the control terms relate to signals generated by the Sequence Control Logic 30 for the following functions to be more fully explained.

DIV—control term for divide instruction DIV

REM—control term for remainder instruction REM

ASA—Add/Subtract control for the A-register at times $T_1, T_3, T_5 \ldots T_{61}$ and $T_{63}$ during DIV and REM instructions and at times $T_{64}$, $T_{65}$ and $T_{70}$ during DIV instructions ASC—Add/Subtract control for the C-register and indicator digits $A_{30}$, $A_{31}$, $A_{32}$ as required at add times $T_1, T_2, T_3 \ldots T_{61}, T_{63}$ for DIV and REM instructions and at times $T_{64}$ and $T_{65}$ for DIV instructions ADE—enable reset logic for A-register at times $T_2, T_4, T_6 \ldots T_{60}$ of both DIV and REM instructions and at time $T_{62}$ of DIV instructions CDE—enable reset logic for C-register at times $T_1, T_2, T_3 \ldots T_{61}$ and $T_{63}$ for DIV and REM instructions and at time $T_{64}$, $T_{65}$ and $T_{70}$ of DIV instructions MDE—enable zero set logic for the M-register at even times $T_{62}$ and $T_{63}$ IDE—enable reset logic for the I-register at even times $T_2, T_4, T_6 \ldots T_{60}$ QDE—enable reset logic for the Q-register at even times $T_2, T_4, T_6 \ldots T_{60}$ LSA—left shift A-register at even times $T_2, T_4, T_6 \ldots T_{60}$ LSC—left shift C-register even at times $T_2, T_4, T_6 \ldots T_{60}$ LSI—left shift I-register even at times $T_2, T_4, T_6 \ldots T_{60}$ LSQ—left shift Q-register even at times $T_2, T_4, T_6 \ldots T_{60}$ ITM—transfer contents of I-register to M-register at time $T_{62}$ QTM—transfer contents of Q-register to M-register at time $T_{62}$ QTA—shift $Q_{29}$ to $A_1$ at even times $T_2, T_4, T_6 \ldots T_{58}$ TEVEN—timing control for times $T_2, T_4, T_6 \ldots T_{60}$ SUC—set up control employed to set the control flip-flops Sc and Mc equal to 1 and 0, respectively prior to time $T_0$ The timing signals $T_0, T_1, T_2, \ldots T_{70}$ are generated by a suitable counter within the Sequence Control Logic 30 which is recycled to zero for time $T_0$ after the divisor has been normalized in the M-register and the instruction DIV to obtain the quotient or the instruction REM to obtain the remainder is ready to be executed.

The assimilation of carry digits $C_i$ with the psuedo-sum digits $A_i$ in response to sequence timing control signals $T_{65}$, $T_{69}$ and $T_{70}$ is accomplished for the instruction DIV to assimilate the carries produced upon combining the quotient digits which have been stored in the Q and I-registers after being developed at even clock times $T_2, T_4, \ldots T_{60}$ and rounded at clock time $T_{62}$. The clock times $T_{63}$ and $T_{64}$ are employed to complete a transfer of the quotient digits to the accumulator and M-register and to combine them arithmetically as will be described more fully hereinafter.

In the first phase of the assimilate mode, zero is added to the accumulator and in the second, carries are propagated to appropriate orders of the C-register by the simple rule of setting $C_i$ equal to one if the next lower orders $C_{i-1}$ and $A_{i-1}$ are both equal to one, or if $A_{i-1}$ is equal to one and $C_{i-1}$ is being set equal to one as a result of a carry to the order of $C_{i-1}$ according to the following function $$R_i=({}_1C_i)=(C_{i-1}+{}_1C_{i-1})A_{i-1}$$

This function, known as the ripple function, requires four clock times for a 29-bit C-register, where a clock time is equal to one microsecond, because of the term ${}_1C_{i-1}$ which may in the extreme case require a carry to ripple from the least significant position to the most significant position. A more complete description of a preferred embodiment of this ripple carry function may be found in a copending U.S. application Ser. No. 287,831 filed June 14, 1963, now U.S. Patent No. 3,249,747, by R. K. Booher and assigned to the assignee of the present application.

In the third phase, after the carry digits $C_i$ have been properly set according to the foregoing ripple function, the true quotient digits $A_i$ are formed in the A-register in one clock time by simply forming the exclusive-or of the contents of the A and C-registers in accordance with the following functions $${}_1A_i=A_i'C_i+A_iC_i'$$
$${}_0A_i=A_iC_i$$

These functions for assimilation of carries are here defined in general terms. A more complete description will be given hereinafter with reference to detailed logic equations.

During assimilation of carries in the accumulator, overflow will be detected if the value $x$ of the accumulator exceeds the range of $-1 \leqslant x < +1-2^{-29}$ at the last clock time $T_{70}$. At that time all the positive carries have been rippled to the digit positions $A_{30}$, $A_{31}$ and $A_{32}$. The logic function for that overflow detection is $${}_1Ov=A_{32}'A_{31}A_{30}T_{70}+A_{32}'A_{31}'A_{30}'T_{70}$$

The second unassimilated carry function or operation is now to be considered in some detail. It is a left shift of the accumulator at even clock times $T_2, T_4, T_6 \ldots T_{60}$. The following table indicates the function of the indicator digits during a left shift operation.

TABLE FOR INDICATOR DIGITS DURING LEFT SHIFTS

| Before Shift | | | | | After Shift | | | |
|---|---|---|---|---|---|---|---|---|
| $A_{32}$ | $A_{31}$ | $A_{30}$ | $A_{29}$ | $C_{29}$ | $A_{32}$ | $A_{31}$ | $A_{30}$ | Ov |
| 0 | 0 | 0 | 0 | 0 | 0 | 0 | 0 | 0 |
| 0 | 0 | 0 | 0 | 1 | 0 | 0 | 1 | 0 |
| 0 | 0 | 0 | 1 | 0 | 0 | 0 | 1 | 0 |
| 0 | 0 | 0 | 1 | 1 | 0 | 1 | 0 | 1 |
| 0 | 0 | 1 | 0 | 0 | 0 | 1 | 0 | 1 |
| 0 | 0 | 1 | 0 | 1 | 0 | 1 | 1 | 1 |
| 0 | 0 | 1 | 1 | 0 | 0 | 1 | 1 | 1 |
| 0 | 0 | 1 | 1 | 1 | 1 | 0 | 0 | 1 |
| 0 | 1 | 0 | 0 | 0 | 1 | 0 | 0 | 1 |
| 0 | 1 | 0 | 0 | 1 | 1 | 0 | 1 | 0 |
| 0 | 1 | 0 | 1 | 0 | 1 | 0 | 1 | 0 |
| 0 | 1 | 0 | 1 | 1 | 0 | 1 | 0 | 0 |
| 0 | 1 | 1 | 0 | 0 | 0 | 1 | 0 | 0 |
| 0 | 1 | 1 | 0 | 1 | 0 | 1 | 1 | 0 |
| 0 | 1 | 1 | 1 | 0 | 0 | 1 | 1 | 0 |
| 0 | 1 | 1 | 1 | 1 | 0 | 0 | 0 | 0 |

Only the states of the indicator digits for the first 16 possible conditions before a shift are shown; for the remaining 16 possible conditions, the flip-flop $A_{32}$ is set indicating a negative overflow which will set the flip-flop $Ov$. These, and the remaining overflow conditions indicated in the table for left shift operations, are detected according to the function $$_1Ov=A_{32}LSC+A_{31}A_{30}'A_{29}'C_{29}'LSC+A_{31}'A_{30}LSC+A_{31}'A_{29}C_{29}LSC$$

That function is combined with other overflow detection functions as defined by the logic equations for the overflow flip-flop $Ov$ set forth hereinbefore. Thus overflow can be detected: during an arithmetic operation at odd bit times $T_1, T_3, T_5 \ldots T_{61}$; during left shift operations at even bit times $T_2, T_4, T_6 \ldots T_{60}$; and during assimilation of quotient digits at bit times $T_{65}$ and $T_{70}$. It should be noted that overflow detection is also effective during bit times $T_{63}$ and $T_{64}$ during which the quotient digits from the I and Q-registers are being entered in the accumulator by addition, but overflow will not occur, if at all, until the carries are assimilated at bit time $T_{70}$. Overflow detection is also effective during the arithmetic operation at bit time $T_{64}$ of the divide instruction REM for adjusting the remainder, but overflow should not occur then.

As noted hereinbefore, the A and Q-registers store the dividend at time $T_0$ while the normalized divisor is stored in the M-register. At time $T_1$ the first arithmetic operation is performed, leaving the first remainder in the accumulator, the most significant half of which is unassimilated. At time $T_2$, and each subsequent even time $T_4$, $T_6 \ldots T_{60}$, the remainder is shifted under the control of Left Shift Logic 70 with $Q_{29}$ being transferred to $A_1$ in response to the signal QTA and other control signals according to the functions $$_1A_1=Q_{29}QTA$$
$$_0A_1=(Q_{29}QTA)'ADE$$
$$_1Q_i=Q_{i-1}LSQ$$
$$_0Q_i=(Q_{i-1}LSQ)'QDE$$

where $i$ represents the integers 2 through 30 for the Q-register, $$_1A_i=A_{i-1}LSA$$
$$_0A_i=(A_{i-1}LSA)'ADE$$

where $i$ represents the integers 2 through 29 for the A-registers, and $$_1A_{30}=A_{29}'C_{29}LSC+A_{29}C_{29}'LSC$$
$$_0A_{30}=A_{29}'C_{29}'LSC$$
$$_0A_{31}=A_{30}'A_{29}'C_{29}LSC+A_{30}'A_{29}C_{29}'LSC+A_{30}A_{29}C_{29}LSC$$

The C and I-registers are similarly shifted to the left. The C-register stores the unassimilated carries of the accumulator and the I-register, together with the Q-register, stores the unassimilated quotient digits. Left shift of the C and I-registers is according to the functions $$_1C_{i+1}=C_iLSC$$
$$_0C_{i+1}=(C_iLSC)'CDE$$

where $i$ represents the integers 3 through 29 for the C-register stages, and $$_1I_i=I_{i-1}LSI$$
$$_0I_i=(I_{i-1}LSI)'IDE$$

where $i$ represents the integers 2 through 30 for the I-register stages.

The Quotient Logic 20 for entering each pair of quotient digits into $Q_1$ and $I_1$ at times $T_2, T_4, T_6 \ldots T_{60}$ is defined by $$_1Q_1=Sc'TEVEN$$
$$_0Q_1=(Sc'TEVEN)'QDE$$
$$_1I_1=Sc'McTEVEN+ScMc'TEVEN$$
$$_0I_1=(Sc'McTEVEN)'(ScMc'TEVEN)'IDE$$

It will be recalled that the control flip-flop $Sc$ provides the Add or Subtract control according to whether it is set equal to 1 or 0, whereas the $Mc$ flip-flop controls the magnitude of the quantity to be added or subtracted. If $Mc$ is set equal to 1, the contents of the M-register are added; otherwise, zero is added. In accordance with the present invention, the "Add Zero" operation is employed only if the sign of the accumulator cannot be determined by inspection of the indicator digits $A_{32}$, $A_{31}$, $A_{30}$ and the five most significant positions $A_{29}$ to $A_{25}$ and $C_{29}$ to $C_{25}$ of the accumulator. The following is a truth table for the formation of the quotient digits.

TABLE FOR QUOTIENT DIGIT FORMATION

| Sc | Mc | Op | $Q_1$ | $I_1$ |
|---|---|---|---|---|
| 0 | 1 | −M | 1 | 1 |
| 1 | 0 | +O | 0 | 1 |
| 1 | 1 | +M | 0 | 0 |

In operation, the flip-flops $Sc$ and $Mc$ are set at even clock times $T_0, T_2, T_4 \ldots T_{60}$, and the operation indicated in the center column is executed at odd clock times $T_1, T_3, T_5 \ldots T_{61}$. The quotient pair of digits indicated in the last two columns is not shifted into the Q and I-register until the next even clock time but only up to clock time $T_{60}$ for a 30-bit quotient. It should be noted that the last or 31st pair of quotient digits $Q_{(31)}$, $I_{(31)}$ determined from the 31st operation at clock time $T_{61}$ is not shifted into the Q and I-registers.

The rules for division which control the nature of the arithmetic operation during each iteration of the recursive routine are the same as in conventional non-restoring division. Those rules are to subtract if the signs of the divisor and partial remainder (or dividend) are alike, and to add if the signs are not alike. However, if the sign of the remainder cannot be determined the operation to be performed is "Add Zero" or "nothing." The following table summarizes those basic rules and their relation to the unique quotient code formed.

TABLE FOR DIVISION ARITHMETIC OPERATIONS

| Sign of Remainder | Sign of Divisor | Operation | $Q_1$ | $I_1$ |
|---|---|---|---|---|
| Positive | Positive | Subtract | 1 | 1 |
| Do | Negative | Add | 0 | 0 |
| Negative | do | Subtract | 1 | 1 |
| Do | Positive | Add | 0 | 0 |
| Unknown | do | Nothing | 0 | 1 |
| Do | Negative | do | 0 | 1 |

Figure 5:
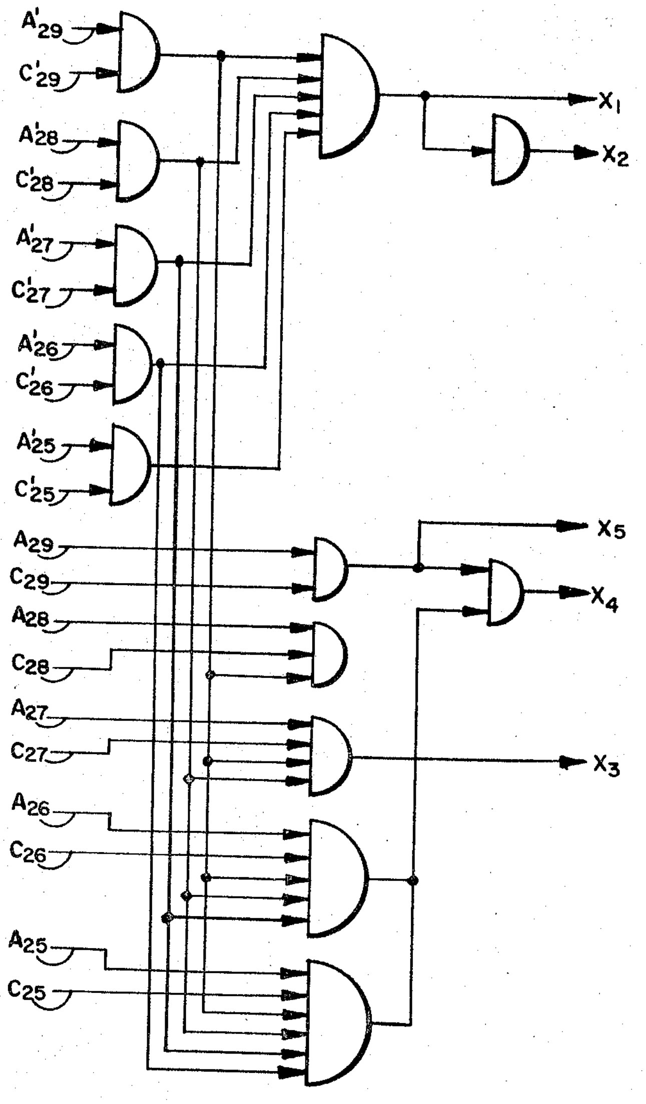
FIGURE 5 is a logic diagram for the examination of the five most significant digit positions of the accumulator to produce signals employed in the determination of the next operation to be performed in the recursive process for division.

The control flip-flops $Sc$ and $Mc$ are set by ADD/SUB Control Logic 50 in accordance with the sign of the divisor and the sign of the dividend or remainder to add the divisor if the signs are alike, and subtract if they are not. To determine the sign, the indicator digits are examined, together with the five most significant bit positions of the accumulator. FIGURE 5 illustrates schematically the logic for examining the five most significant bit positions and derving therefrom the signals $X_1$, $X_2$, $X_3$, $X_4$ and $X_5$. In general, the logic for $X_1$ detects the absence of a carry from any one of the five most significant positions of the accumulator, which will block the propagation of any carry from lower orders of the accumulator not examined to the sign indicator positions, and the logic for $X_4$ detects the presence of a carry from any one of those positions being propagated into the indicator position $A_{30}$ if the carries equations.

$$X_1=A_{29}'C_{29}'+A_{28}'C_{28}'+A_{27}'C_{27}'+A_{26}'C_{26}'+A_{25}'C_{25}'$$
$$X_4=A_{29}C_{29}+A_{28}C_{28}(A_{29}+C_{29})+A_{27}C_{27}(A_{28}+C_{28})(A_{29}+C_{29})+A_{26}C_{26}(A_{27}+C_{27})(A_{28}+C_{28})(A_{29}+C_{29})+A_{25}C_{25}(A_{26}+C_{26})(A_{27}+C_{27})(A_{28}+C_{28})(A_{29}+C_{29})$$

The signal $X_2$ is the complement of $X_1$, and the combination $X_3X_5$ is the complement of $X_4$.

The following is a table for the setting of the control flip-flops Sc and Mc by inspection of the sign of the divisor $M_{30}$, the indicator digits $A_{31}$ and $A_{30}$, and the terms $X_4$ and $X_1$ which examine the five most significant bit positions of the accumulator to determine, if possible, the sign of the accumulator if the carries were to be assimilated.

TABLE FOR SETTING THE CONTROL FLIP-FLOP Sc AND Mc

| | $M_{30}$ | $A_{31}$ | $A_{30}$ | $X_4$ | $X_1$ | Sc | Mc | Ov |
|---|---|---|---|---|---|---|---|---|
| 1 | 0 | 0 | 0 | 0 | 0 | 0 | 1 | 0 |
| 2 | 0 | 0 | 0 | 0 | 1 | 0 | 1 | 0 |
| 3 | 0 | 0 | 0 | 1 | 0 | 0 | 1 | 0 |
| 4 | 0 | 0 | 0 | 1 | 1 | 0 | 1 | 0 |
| 5 | 0 | 0 | 1 | 0 | 0 | 0 | 1 | 1 |
| 6 | 0 | 0 | 1 | 0 | 1 | 0 | 1 | 1 |
| 7 | 0 | 0 | 1 | 1 | 0 | 0 | 1 | 1 |
| 8 | 0 | 0 | 1 | 1 | 1 | 0 | 1 | 1 |
| 9 | 0 | 1 | 0 | 0 | 0 | 1 | 1 | 0 |
| 10 | 0 | 1 | 0 | 0 | 1 | 1 | 1 | 0 |
| 11 | 0 | 1 | 0 | 1 | 0 | 1 | 1 | 0 |
| 12 | 0 | 1 | 0 | 1 | 1 | 1 | 1 | 0 |
| 13 | 0 | 1 | 1 | 0 | 0 | 1 | 0 | 0 |
| 14 | 0 | 1 | 1 | 0 | 1 | 1 | 1 | 0 |
| 15 | 0 | 1 | 1 | 1 | 0 | 0 | 1 | 0 |
| 16 | 0 | 1 | 1 | 1 | 1 | 0 | 1 | 0 |
| 17 | 1 | 0 | 0 | 0 | 0 | 1 | 1 | 0 |
| 18 | 1 | 0 | 0 | 0 | 1 | 1 | 1 | 0 |
| 19 | 1 | 0 | 0 | 1 | 0 | 1 | 1 | 0 |
| 20 | 1 | 0 | 0 | 1 | 1 | 1 | 1 | 0 |
| 21 | 1 | 0 | 1 | 0 | 0 | 1 | 1 | 1 |
| 22 | 1 | 0 | 1 | 0 | 1 | 1 | 1 | 1 |
| 23 | 1 | 0 | 1 | 1 | 0 | 1 | 1 | 1 |
| 24 | 1 | 0 | 1 | 1 | 1 | 1 | 1 | 1 |
| 25 | 1 | 1 | 0 | 0 | 0 | 0 | 1 | 0 |
| 26 | 1 | 1 | 0 | 0 | 1 | 0 | 1 | 0 |
| 27 | 1 | 1 | 0 | 1 | 0 | 0 | 1 | 0 |
| 28 | 1 | 1 | 0 | 1 | 1 | 0 | 1 | 0 |
| 29 | 1 | 1 | 1 | 0 | 0 | 1 | 0 | 0 |
| 30 | 1 | 1 | 1 | 0 | 1 | 0 | 1 | 0 |
| 31 | 1 | 1 | 1 | 1 | 0 | 1 | 1 | 0 |
| 32 | 1 | 1 | 1 | 1 | 1 | 1 | 1 | 0 |

From that table it may be seen that of the first eight cases, the sign of the accumulator indicated by positions $A_{31}$ and $A_{30}$ is positive and since the sign of the divisor is also positive, the next operation to be performed (after shifting the accumulator one place to the left) is a subtraction of the divisor in the M-register. It should be noted that in four of those cases there is an overflow indicated by setting the flip-flop Ov. In all of those eight cases the sign of the accumulator can be determined without reference to the signals $X_4$ and $X_1$ because a carry into position $A_{30}$ would not change the sign, although only those cases not resulting in an overflow are of any real interest. The next four cases may also be interpreted directly as negative values in the accumulator without reference to the signals $X_4$ and $X_1$ for the same reason to determine that the next operation to be performed be an addition of the divisor. This is based on the basic rule noted hereinbefore that the operation should be subtraction for like signs, and addition for unlike signs.

The next four cases 13 to 16 require examination of the signals $X_4$ and $X_1$, and their complements, to determine the sign of the accumulator since a carry into position $A_{30}$ would change the sign from negative to positive. Of those four cases, three can be resolved by examination of the signals $X_4$ and $X_1$. In cases 15 and 16, the signal $X_4$ indicates that there is a carry from the unassimilated portion of the accumulator into the position $A_{30}$, from which it is determined that the sign of the accumulator is positive and the divisor should be subtracted in the next operation because the sign of the divisor is also positive.

In case 14, the signal $X_4$ is equal to 0 indicating that there is not a carry being generated in the five most significant positions of the accumulator examined, and the signal $X_1$ is equal to 1 indicating that any carry which may be generated in the less significant positions of the accumulator not examined will not be propagated into the sign indicating positions. Consequently, in case 14 the sign of the partial remainder is conclusively determined to be negative. An example will facilitate in understanding this determination. Assume the following configuration for a given remainder in the accumulator

| $A_{31}$ | $A_{30}$ | $A_{29}$ | $A_{28}$ | $A_{27}$ | $A_{26}$ | $A_{25}$ | $A_{24}$ | $A_{23}$ |
|---|---|---|---|---|---|---|---|---|
| 1 | 1 . | 1 | 0 | 1 | 0 | 0 | 0 | 1 |
| | | $C_{29}$ | $C_{28}$ | $C_{27}$ | $C_{26}$ | $C_{25}$ | $C_{24}$ | $C_{23}$ |
| | | 0 | 1 | 0 | 0 | 1 | 1 | 1 |

That configuration would not produce a signal $X_4$ equal to 1, thereby indicating the configuration is to be classed with case 13 or 14. A signal $X_1$ equal to 1 produced by the combination $A_{26}'$ $C_{26}'$ distinguishes that configuration as one to be classed with case 14. A carry which would be generated by adding the unassimilated carry $C_{23}$ to the pseudo sum digit $A_{23}$ would be propagated to the position $C_{26}$ because of the presence of carry digits $C_{24}$ and $C_{25}$, but not beyond that position $C_{26}$ because both $A_{26}$ and $C_{26}$ are equal to 0.

The ADD/SUB Control Logic 50 employs the logic network of FIGURE 5 to detect the condition of case 13 in the foregoing table, which is the condition of the signal $X_4$ equal to 0 indicating that a carry is not being generated by the five most significant positions examined, and the signal $X_1$ equal to 0 indicating that a carry which may be generated to the less significant positions may be propagated to the sign positions. An example will facilitate understanding the detection of configurations classed with case 13. Assume the following configuration for a given remainder in the accumulator.

| $A_{31}$ | $A_{30}$ | $A_{29}$ | $A_{28}$ | $A_{27}$ | $A_{26}$ | $A_{25}$ | $A_{24}$ . . . |
|---|---|---|---|---|---|---|---|
| 1 | 1. | 1 | 0 | 1 | 1 | 0 | 1 |
| | | $C_{29}$ | $C_{28}$ | $C_{27}$ | $C_{26}$ | $C_{25}$ | $C_{24}$ . . . |
| | | 0 | 1 | 0 | 0 | 1 | 1 |

That configuration would not produce a carry signal $X_4$ which would identify it as either case 15 or 16 when the sign is positive. Thus the absence of a signal $X_4$, or the presence of its complement $X_3$, $X_5$, indicates the configuration is either case 13 or 14. The logic for the signal $X_1$ examines the A and C-register positions 25 to 29 to determine whether there is a bit zero in any one of the corresponding positions examined of both the A and C-registers. If so, an unassimilated carry from the truncated portion of the accumulator (positions 1 to 24) would not be propagated to the position $A_{30}$ and it can be safely "determined" the accumulator is indeed negative. However, in the assumed configuration there is a single bit 1 in each of the positions 25 to 29 of the accumulator (and not a pair for that would produce a carry indicating signal $X_4$ to classify it as case 15 or 16). Accordingly, a carry from position 24 would be propagated to the position $A_{30}$ if the carries were to be assimilated. Thus the configuration of a single bit 1 in each position 25 to 29 of the accumulator should be classified as case 13 where the sign of the accumulator is not known and an "add zero" operation is to be performed. On the other hand, if $X_1$ is true, the configuration may be unconditionally determined to be case 14.

Cases 17 to 22 correspond to cases 1 to 16 respectively insofar as determining the sign of the accumulator is concerned. The only difference is that in those cases the sign of the divisor is negative so that the operation indicated by the control flip-flop Sc is opposite that indicated for the cases 1 to 16, except for case 29 where the "add zero" operation remains the same as for the corresponding case 13.

From the foregoing table it may be seen that the divisor in the M-register is to be added or subtracted in every case except cases 13 and 29. Accordingly, the control flip-flop Mc is to be set equal to 1 in every case except 13 and 29. The control flip-flop Sc is set equal to 1 or 0 as indicated for each case. To eliminate some otherwise redundant logic gates, the flip-flops Sc and Mc are set equal to 1 and 0, respectively, prior to the initial time $T_0$ upon decoding the instruction to divide for either the quotient or the remainder by a control signal from the instruction decoding section which may be denominated SUC for "Set-up control." The logic for the flip-flops are then as follows $$
\begin{aligned}
{}_1Sc = {} & A_{31}A_{30}X_4M_{30}(TEVEN+T_{62}REMSc') \\
& + A_{31}A_{30}X_1M_{30}'X_5X_3(TEVEN+T_{62}REMSc') \\
& + A_{31}'M_{30}(TEVEN+T_{62}REMSc') \\
& + A_{31}A_{30}'M_{30}'(TEVEN+T_{62}REMSc') \\
& + A_{31}A_{30}X_5X_3X_2(TEVEN+T_{62}REMSc') \\
& + SUC + T_{62}DIV \\
{}_0Sc = {} & (A_{31}A_{30}X_4M_{30})'(A_{31}A_{30}X_1M_{30}'X_5X_3)'(A_{31}'M_{30})' \\
& \quad (A_{31}A_{30}'M_{30}')'(A_{31}A_{30}X_5X_3X_2)'(T_0+TEVEN) \\
& + (A_{31}A_{30}X_4M_{30})'(A_{31}A_{30}X_1M_{30}'X_5X_3)'(A_{31}'M_{30})' \\
& \quad (A_{31}A_{30}'M_{30})'(A_{31}A_{30}X_5X_3X_2)'T_{62}REMMc \\
& + A_{31}A_{30}X_5X_3X_2T_{62}REMScMc \\
{}_1Mc = {} & (A_{31}A_{30}X_5X_3X_2)'(T_0+TEVEN)+T_{62}DIV \\
{}_0Mc = {} & A_{31}A_{30}X_5X_3X_2TEVEN+SUC+T_{64}DIV
\end{aligned}
$$

The term TEVEN is the timing control for all even clock times $T_2$ to $T_{60}$ which. together with the initial time $T_0$, takes care of all the recursive iterations of the process as may be more readily seen from FIGURE 2.

Following the last arithmetic operation at time $T_{61}$ which is performed to effectively generate a 31st pair of quotient digits, the sign of the accumulator is again determined, not for setting the control flip-flop Sc and Mc since still another operation need not be performed, except under the control terms $T_{62}$ DIV and $T_{62}$ REM, but for setting the two least significant flip-flops $C_1$ and $C_2$ as the accumulator is cleared, thereby to round the quotient in accordance with what the next operation would have been, which effectively looks ahead to see if a carry would have been propagated into the 31st bit position of the quotient had division been carried out further.

As noted hereinbefore, an advantage of the unique unassimilated quotient code configuration employed herein is that to obtain the final quotient, the contents of the Q and I-registers are simply added during bit times $T_{63}$ and $T_{64}$. There is no need to provide any additional storage elements associated with the Q and I-registers for the extra pair of quotient digits deduced from the nature of the operation indicated at bit times $T_{61}$ and $T_{62}$. Instead, in accordance with the present invention, the nature of the operation is interpreted directly to determine whether the quotient should be rounded; if so, the least significant bit position $C_1$ of the C-register is set equal to 1 at the time $T_{62}$ the accumulator is cleared for adding the contents of the Q and I-registers at bit times $T_{63}$ and $T_{64}$. The result is adding a bit 1 to the least significant position of the quotient.

ADD/SUB Control Logic 50 is employed to not only set the control flip-flops Sc and Mc, and thereby store the quotient digits in the flip-flops $Q_1$ and $I_1$ through the Quotient Logic 20, but also to round the quotient by setting the flip-flops $C_1$ and $C_2$ of the accumulator at time $T_{62}$ of the divide instruction DIV through Quotient Round Logic 60 at time $T_{62}$ in accordance with the following table:

TABLE FOR ROUNDING QUOTIENT

| | $T_{61}$ | $T_{62}$ | $C_2$ | $C_1$ |
|---|---|---|---|---|
| 1 | Add M | Add M | 0 | 0 |
| 2 | Add M | Sub M | 0 | 1 |
| 3 | Sub M | Add M | 0 | 1 |
| 4 | Sub M | Sub M | 1 | 0 |
| 5 | Add 0 | Add M | 0 | 1 |
| 6 | Add 0 | Sub M | 0 | 1 |
| 7 | Add M | Add 0 | 0 | 1 |
| 8 | Sub M | Add 0 | 0 | 1 |
| 9 | Add 0 | Add 0 | 0 | 1 |

The advantage of looking at the extra operation which was performed at bit time $T_{61}$ and the operation which would have been performed at bit time $T_{63}$ if division were to be carried out to a 32-bit unassimilated quotient is to effectively provide a 31-bit assimilated quotient which may be rounded by adding a bit 1 into the least significant bit position of the 30-bit quotient if the extra quotient bit is a 1. For example, case 2 may be interpreted as providing the following quotient configuration.

| $Q_{30}$ . . . . . $Q_1$ | 01 |
|---|---|
| $I_{30}$ . . . . . $I_1$ | 01 |

That configuration shows that when the quotient is assimilated by adding the contents of the Q and I-registers together in the accumulator, including the pair of digits determined but not stored, the quotient should be rounded by adding a bit 1. That is accomplished by the Quotient Round Logic 60 which sets the flip-flop $C_1$ of the C-register at time $T_{62}$ while the accumulator is being cleared to receive the quotient from the Q and I-registers via the M-register. Case 3 is interpreted by the Quotient Round Logic 60 in a similar way. The configuration for that case is as follows:

| $Q_{30}$ . . . . . $Q_1$ | 10 |
|---|---|
| $I_{30}$ . . . . . $I_1$ | 10 |

The only difference is that instead of rounding because of a bit 1 in the next least significant position outside the register of the assimilated quotient, rounding is indicated because of a carry which should be propagated into the least significant bit position of the assimilated quotient. Case 5 is interpreted in the same way as case 2 and case 6 is interpreted in the same way as case 3. Case 4 is interpreted in the same way as case 2 and case 3, resulting in the addition of binary 2 to the quotient for rounding. That is accomplished through the Quotient Round Logic 60 by setting the flip-flop $C_2$ at time $T_{62}$.

In the algorithm employed in this improved non-restoring division with unassimilated carries, the rule actually followed is to determine the sign of the remainder in order to be able to either add or subtract the divisor if the absolute value of the remainder is equal to or greater than 1/32 before shifting, so that after shifting for the next operation, the divisor is added or subtracted if the absolute value of the remainder is equal to 1/16. Otherwise, if the sign is not determinable the operation is "add zero." Cases 7, 8 and 9 are those in which the last operation indicated at bit time $T_{62}$ is "add zero" because the sign of the remainder at time $T_{62}$ is not determinable. The configuration for those cases are as follows:

| Case 7 | | Case 8 | | Case 9 | |
|---|---|---|---|---|---|
| $Q_1$ | 00 | $Q_1$ | 10 | $Q_1$ | 00 |
| $I_1$ | 01 | $I_1$ | 11 | $I_1$ | 11 |

Since it is not known what the nature of the last operation should have been had the sign of the remainder been at time $T_{62}$, it is not possible to determine how to accurately round the quotient.

In case 7, if division were to be carried out to more places, it is possible that a carry would be propagated into the bit position next to the I and Q-registers to indicate a bit 1 should be added to the final quotient as in case 5. However, the probability that such a carry would not be propagated is the same. It should be noted that in each of the previous cases the propagation of such a carry was not considered because it would not have made any difference in the rounding operation indicated. In case 8, the propagation of such a carry would have indicated a bit 1 should be added and a carry propagated into the least significant bit position of the 30-bit quotient as in case 4. In case 9, the propagation of such a carry would not affect the result so that it may be dis- ;arded and the quotient rounded as in either case 5 6. The only cases in doubt then are 7 and 8.

In case 7 the arbitrary choice is made to round the otient by setting the flip-flop $C_1$ so that, although the otient in a given case may be too high by the value $2^{-30}$, the average error of the quotients falling in the tegory of cases 7 and 8 is zero because in case 8, the bitrary choice is made to round the quotient by setting ; flip-flop $C_1$ instead of $C_2$ so that the quotient may too low by the value of $2^{-30}$ in a given case. Thus e selections in cases 7 and 8 were purposely made so at statistically the average error of *all* quotients is zero. ie error which may be present in a given case is not ;nificant by itself; it is only the cumulative error which ould be significant. This averaging technique maintains e cumulative error equal to zero if at least one of the erands is selected at random each time division is perrmed.

Quotient Round Logic 60 which implements the foreing table is as follows:

$$_1C_1 = Sc'McASC + Sc(_0Sc)T_{62}DIV + Mc'T_{62}DIV + (_0Mc)T_{62}DIV$$

he flip-flop is set at bit time $T_{61}$ by the first term :'McASC, and remains set until bit time $T_{62}$, thereby aplementing the table for cases 3 and 8. Case 2 is aplemented by the next term $Sc(_0Sc)T_{62}DIV$ where Sc presents the state the flip-flop Sc was in at time $T_{61}$ id $(_0Sc)$ represents the logic $$(_0Sc) = (A_{31}A_{30}X_4M_{30})'(A_{31}A_{30}X_1M_{30}'X_5X_3)'(A_{31}M_{30})'(A_{31}A_{30}'M_{30}')'(A_{31}A_{30}X_5X_3X_2)'$$

hich is the zero-set logic for the flip-flop Sc as de:ribed hereinbefore without the $T_0$ and TEVEN timing ontrol so that whereas the flip-flop Sc is not zero-set, ie flip-flop $C_1$ is set. Cases 5, 6 and 9 are implemented y the term $Mc'T_{62}DIV$. Case 7 is implemented by $(_0Mc)T_{62}DIV$ where $(_0Mc)$ represents the logic $$(_0Mc) = A_{31}A_{30}X_3X_2X_6$$

'hich is the zero-set logic for the flip-flops Mc as de:ribed hereinbefore without the timing control TEVEN, ) that whereas the flip-flop Mc is not zero-set, the flipop $C_1$ is set. Cases 1 and 4 are taken care of by the )gic $$_0C_1 = ScASC + Sc'Mc(_0Sc)T_{62}DIV + (T_{62}DIV)'(ASC)'CDE$$

'he first term ScASC zero-sets the flip-flop $C_1$ for all dd operations at time $T_{61}$. That also zero-sets the flipop $C_1$ at time $T_{61}$ for cases 2, 5, 6, 7 and 9, but at time $T_{62}$ the terms $Sc(_0Sc)T_{62}DIV$ and $Mc'T_{62}DIV$ will set he flip-flop $C_1$ as just described. Case 7 is taken care of by the term $Sc'Mc(_0Sc)T_{62}DIV$. In summary, for ases 1, 3 and 8 the flip-flops $C_1$ is in the proper state t time $T_{61}$; that state is permitted to carry over at time $T_{62}$. For cases 2, 5, 6, 7 and 9, the flip-flop $C_1$ is proprly set at time $T_{62}$ and for case 4 the flip-flop $C_1$ is zeroet at time $T_{62}$. The last term for zero-setting the fliplop $C_1$ is provided to clear it during a left shift oper.tion.

It should be noted that for each subtract operation, he least significant digit of the C-register is set in ac:ordance with the function $$_1C_1 = Sc'McASC$$

The reason is that the divisor is subtracted by adding he one's complement in accordance with the function $$b_i = M_i'Sc'Mc$$
$$b_i' = M_iSc'Mc$$

When the flip-flop $C_1$ is thereby set, the two's complement s effectively formed for correct subtraction, although he binary 1 is stored therein as an unassimilated carry o be added when the next arithmetic operation is per:ormed.

The Quotient Round Logic 60 for case 4 is simply $Sc'Mc(_0Sc)T_{62}DIV$ for setting the flip-flop $C_2$ of the C-register equal to 1 while the same logic is zero-setting the flip-flop $C_1$ as just described, thereby adding binary 2 to the quotient. The complete logic for the flip-flop $C_2$ is as follows.

$$_1C_2 = A_1C_1ASC + A_1b_1ASC + C_1b_1ASC + C_1LSC + Sc'Mc(_0Sc)T_{62}DIV + R_1T_{69}DIV$$

$$_0C_2 = (A_1C_1ASC)'(A_1b_1ASC)'(C_1b_1ASC)'(C_1LSC)'(Sc'Mc(_0Sc)T_{62}DIV)'CDE$$

Those equations include the logic for addition and subtraction under the control of the signal ASC and for left shift under the control of the signal LSC which corresponds to logic given hereinbefore for the flip-flops $C_3$ to $C_{29}$ of the C-register. Also included in the logic for those stages of the C-register is the ripple carry function $R_iT_{69}DIV$ employed in the assimilation of carries when the quotient from the A and I-registers are assimilated. Such a term is combined by an OR function with the logic for each stage of the C-register, except the first $C_1$, to accomplish the result indicated by $$_1C_{i+1} = R_iT_{69}DIV$$

where $i$ represents the integers from 1 to 28 and $$R_i = A_i(C_i + _1C_i)$$

The corresponding ripple carry function for the flip-flop $C_2$ is $$_1C_2 = R_1T_{69}DIV$$

The ripple carry function will be described with reference to bit times $T_{65}$ to $T_{70}$ of the flow chart in FIGURE 2.

After the quotient has been developed in the Q and I-registers at even bit times $T_2, T_4 \ldots T_{60}$, and effectively rounded by setting the flip-flops $C_1$ and $C_2$ as just described at bit time $T_{62}$, the quotient is transferred to the accumulator for assimilation. The contents of the I-register are first transferred to the M-register at bit time $T_{62}$ while the accumulator is cleared, except for bit positions $C_1$ and $C_2$ in the C-register, in response to the control signals ADE and CDE associated with the A and C-register. At the same time the indicator flip-flop $A_{32}$ is set in accordance with the logic $$_1A_{32} = I_{30}Q_{30}'T_{62}DIV$$

$$_0A_{32} = (LSC)'(I_{30}Q_{30}'T_{62}DIV)'ADE + T_{70}$$

The combination $I_{30}Q_{30}'$ is the pair of quotient digits generated during the first arithmetic operation at time $T_1$ of the recursive operation if the sign of the dividend could not be determined and an "add zero" operation was performed. Under those circumstances, it is known in advance that an overflow cannot occur in the quotient. Consequently, for proper overflow detection at the last bit time $T_{70}$, the position $A_{32}$ is set equal to 1 if $I_{30}$ is equal to 1 and $Q_{30}$ is equal to 0 at time $T_{62}$ and reset equal to 0 at time $T_{70}$. That overflow detection is in accordance with the following logic.

$$_1Ov = A_{32}'A_{31}'A_{30}'T_{70} + A_{32}'A_{31}A_{30}T_{70}$$

This special overflow detection is required for the last step of assimilating the quotient since $A_{31}'A_{30}$ then represents a valid negative number and $A_{31}A_{30}'$ represents a valid positive number.

The assimilation of the quotient will now be described in detail. Once the accumulator has been cleared, the flip-flops $C_1$ and $C_2$ have been set to round the product, the indicator flip-flops $A_{32}$ has been set as required, and the contents of the I-register has been transferred to the Q-register, all at clock time $T_{62}$, the contents of the M-register is added to the accumulator at clock time $T_{63}$ in response to the control signals ASA and ASC in accordance with the logic $$_1A_i = A_i'C_i'b_iASA$$
$$_1A_{30} = A_{30}'C_{30}'b_{30}ASC$$
$$_1A_{31} = A_{31}'A_{30}'C_{30}'b_{30}ASC$$

where, as noted hereinbefore, $$b_i = M_iScMc$$

for all integral values of $i$ from 1 to 29, and, as noted hereinbefore, $$C_{30}' = (A_{29}C_{29} + A_{29}b_{29} + C_{29}b_{29})'$$

Thus, the contents of the flip-flops $I_1$ to $I_{29}$ is effectively transferred to the flip-flops $A_1$ to $A_{29}$, respectively, and the content of the flip-flop $I_{30}$ is transferred to the indicator flip-flops $A_{30}$ and $A_{31}$ at clock time $T_{63}$. At the same time $T_{63}$, the content of the Q-register is transferred to the M-register. The logic transferring the contents of the I and Q-registers to the M-register is as follows:

$$_1M_i = I_iITM + Q_iQTM$$
$$_0M_i = (I_iITM + Q_iQTM)'MDE$$

for all integral values of $i$ from 1 to 30.

Figure 1:
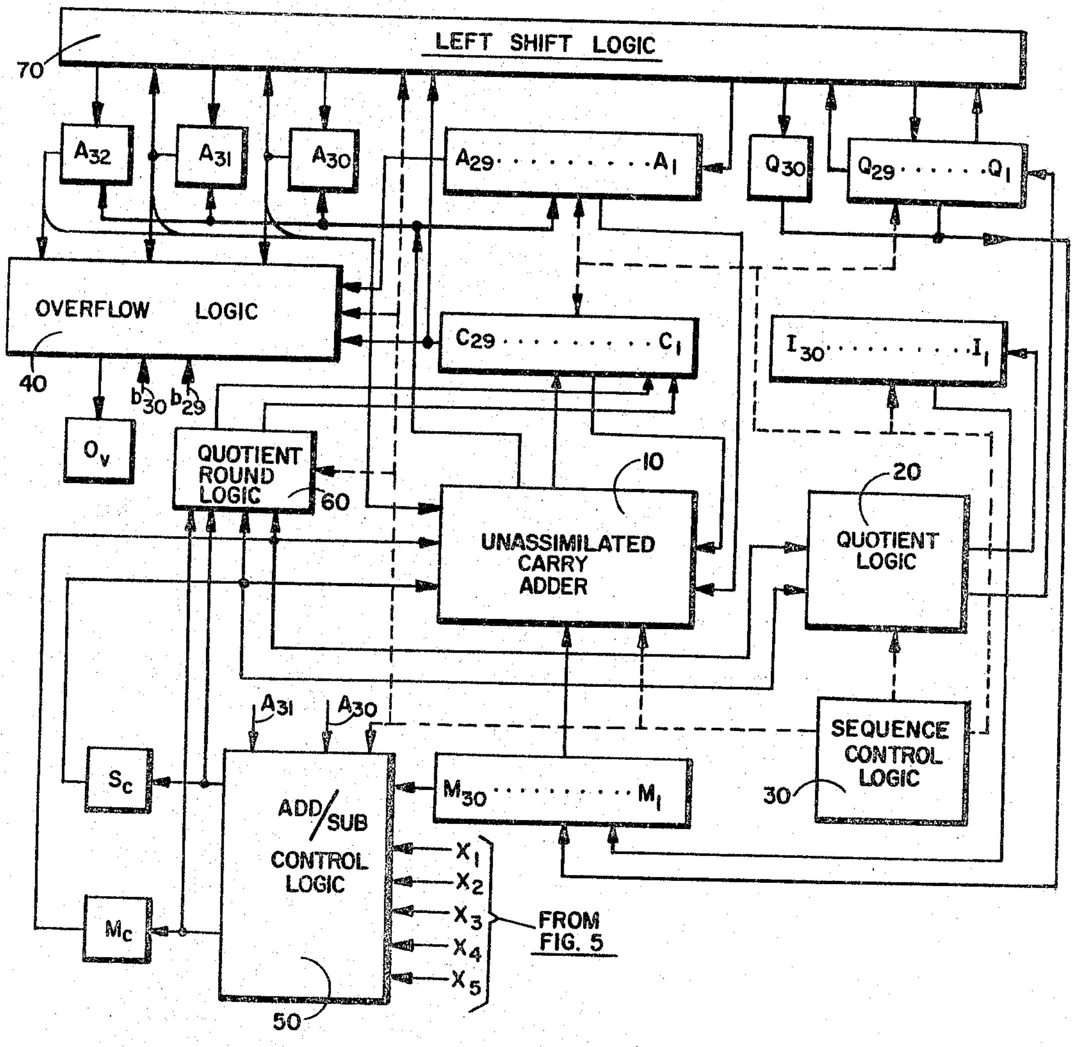
FIGURE 1 is a block diagram illustrating the organi- zation of registers and control functions for division with ınassimilated carries in one embodiment of the invention.

At time $T_{64}$, the contents of the M-register is added to the content of the accumulator in response to the control signals ASA and ASC in accordance with the full logic for the Unassimilated Carry Adder 10 of FIGURE 1. In that manner, the unassimilated quotient in the Q and I-registers is finally combined in the accumulator but in an unassimilated form, which is with psuedo-sum digits in the A-register and carry digits in the C-register. The quotient could be left in the accumulator in that form and the carries assimilated only if the next instruction requires it, such as to store the quotient in memory. However, even if the next instruction were not to require it, such as an instruction to add thereto the content of a memory location, it is desirable to assimilate the carries in order to detect any overflow which may result. That is accomplished during clock times $T_{65}$ to $T_{70}$, while the next instruction is being fetched from memory. Overflow is then detected if the value of the quotient exceeds the range of $-1 \leqslant Q < +1-2^{-29}$ in accordance with the special logic $$_1Ov = A_{32}'A_{31}A_{30}T_{70} + A_{32}'A_{31}'A_{30}'T_{70}$$

In order to be able to assimilate the carries during times $T_{65}$ to $T_{70}$, the control flip-flops Sc and Mc must be set for the "add zero" operation. That is accomplished by setting the flip-flop Mc equal to zero in response to the control term $T_{64}$ DIV. The flip-flop Sc set equal to one in response to the control term $T_{62}$ DIV is allowed to remain at that state. Thus, at time $T_{65}$, the first phase of assimilating the carries is executed by an "add zero" operation in response to the control signals ASA and ASC. That phase consists of forming the EXCLUSIVE-OR of the A and C-registers contents in the A-register, and forming the logical AND of the A and C-registers in the C-register in accordance with the logic $$_1A_i = A_i'C_ib_i'ASA$$
$$_0A_i = A_iC_ib_i'ASA$$
$$_1C_i = A_iC_iASC$$

where $i$ represents the integers from 1 through 29. At time $T_{69}$, the ripple carry function is performed. That function is the propagation of carries to appropriate orders of the C-register by setting a given flip-flop $C_i$ according to the function $$_1C_{i+1} = A_i(C_i + {_1C_i})$$

where $$_1C_i = A_{i-1}(C_{i-1} + {_1C_{i-1}})$$

Figure 6:
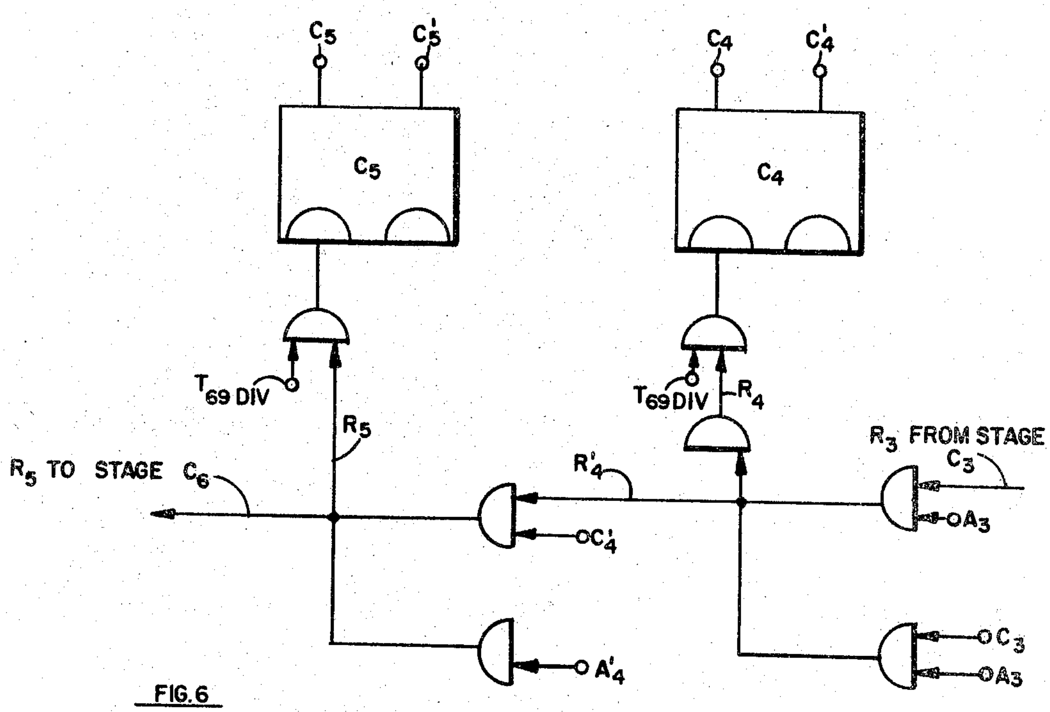
FIGURE 6 illustrates a preferred implementation for a ripple carry function employed in assimilating the con- tents of the accumulator which separately stores carries.

That function is implemented by first forming a ripple term $R_i = A_i(C_i + {_1C_i})$ and synchronizing it with the timing conftrol signal $T_{69}$ of the instruction DIV. The logic equation for the C-register is then as follows $$_1C_{i+1} = A_iC_iASC + A_ib_iASC + C_ib_iASC + C_iLSC + R_iT_{69}\mathrm{DIV}$$

where $i$ represents the integers from 1 through 28. It should be noted that there is not a corresponding zero-set term since the function is the propagation of carries only, and also that there is not a ripple carry function for the least significant flip-flop $C_1$ for the obvious reason that there is not a lower order in the accumulator from which a carry is to be propagated. A preferred implementation of the foregoing ripple carry function with NAND-gates is illustrated in FIGURE 6 for a pair of stages. The pattern repeats itself for the complete C-register. For a more complete description of this method of assimilating carries, reference should be made to the aforementioned copending application Ser. No. 287,831, filed June 14, 1963, by R. K. Booher. It should be further noted that a ripple carry function out of the 29th order is formed to produce the carry signal $R_{30}$ according to the function $$R_{30} = A_{29}(C_{29} + {_1C_{29}})$$

That function is implemented by synchronizing that ripple term $R_{30}$ with the timing control signal $T_{69}$ of the instruction DIV and combining it with the indicator digits from flip-flops $A_{30}$ and $A_{31}$ according to the following table:

TABLE FOR RIPPLE CARRY FUNCTION OF INDICATOR DIGITS

| $T_{65}$ | | | | $T_{69}$ | | | $T_{70}$ |
|---|---|---|---|---|---|---|---|
| $A_{32}$ | $A_{31}$ | $A_{30}$ | $R_{30}$ | $A_{32}$ | $A_{31}$ | $A_{30}$ | Ov |
| 0 | 0 | 0 | 1 | 0 | 0 | 1 | 0 |
| 0 | 0 | 1 | 0 | 0 | 0 | 1 | 0 |
| 0 | 0 | 1 | 1 | 0 | 0 | 1 | 0 |
| 0 | 1 | 0 | 0 | 0 | 1 | 0 | 0 |
| 0 | 1 | 0 | 1 | 0 | 1 | 1 | 1 |
| 0 | 1 | 1 | 0 | 0 | 1 | 1 | 1 |
| 0 | 1 | 1 | 1 | 0 | 0 | 0 | 1 |
| 1 | 0 | 0 | 0 | 1 | 0 | 0 | 0 |
| 1 | 0 | 0 | 1 | 1 | 0 | 1 | 0 |
| 1 | 0 | 1 | 0 | 1 | 0 | 1 | 0 |
| 1 | 0 | 1 | 1 | 1 | 1 | 0 | 0 |
| 1 | 1 | 0 | 0 | 1 | 1 | 0 | 0 |
| 1 | 1 | 0 | 1 | 1 | 1 | 1 | 0 |
| 1 | 1 | 1 | 0 | 1 | 1 | 1 | 0 |
| 1 | 1 | 1 | 1 | 1 | 0 | 0 | 0 |

That table is implemented according to the functions $$_1A_{30} = A_{31}A_{30}'R_{30}T_{69}DIV + A_{31}'A_{30}'R_{30}T_{69}DIV$$
$$_0A_{30} = A_{31}A_{30}R_{30}T_{69}DIV$$
$$_1A_{31} = A_{32}A_{32}'A_{30}R_{30}T_{69}DIV$$
$$_0A_{31} = A_{31}A_{30}R_{30}T_{69}DIV$$

Referring to the foregoing table for the ripple carry function, it may be seen that the indicator digits $A_{32}$, $A_{31}$ and $A_{30}$ provide a code 000 or 011 for the only conditions resulting in an overflow indicated in the last column. Thus, the flip-flop $A_{30}$ provides the correct sign for either a positive or negative quotient which may be stored in memory as part of a 30-bit number, except when an overflow condition indicated by a bit 1 in the last column is detected at the last clock time $T_{70}$ according to the function $$_1Ov = A_{32}'A_{31}A_{30}T_{70}DIV + A_{32}'A_{31}'A_{30}'T_{70}DIV$$

It will be recalled that at time $T_{62}$, when the accumulator was cleared to receive the quotient digits from the I-register, $A_{32}$ was set equal to 1 if the pair of quotient digits or the most significant position of the Q and I-registers is 0,1 since such a pair of quitient digits indicates that the sign of the dividend was not determinable at time $T_0$, but the dividend was thereby known to be within the range of $-1/32$ to $+1/16$ while the divisor was known to be greater than $1/2$. Under those circumstances, no erflow can occur regardless of the states of the flip-ıps $A_{31}$ and $A_{30}$ at time $T_{69}$.

The third phase of the process for assimilating the car-ıs consists of forming the EXCLUSIVE-OR function the contents of the A. and C-registers in the C-register time $T_{70}$ according to the same function as for the st phase at time $T_{63}$ under the control term ASA which ːcurs again at time $T_{70}$ DIV to "add zero" to the ac-mulator at time $T_{70}$. It should be noted that the con-ɔl for "add zero" has been carried over from time $T_{65}$. t the same time $T_{70}$, a check for overflow is performed just described, the indicator flip-flops $A_{32}$ is set equal zero and the indicator flip-flop $A_{31}$ is set equal to $A_{30}$ accordance with the following functions:

$$_{32}=T_{70}DIV$$
$$_{31}=A_{31}'A_{30}T_{70}DIV$$
$$_{31}=A_{31}A_{30}'T_{70}DIV$$

After the clock time $T_{70}$ has occurred, the rounded ıotient is contained in the accumulator in an assimi-ted form suitable for storing in memory or for further ːocessing, with the overflow flip-flop set according to hether an overflow has been detected at any time dur-ıg the recursive process as a result of the left shift, arith-ıetic operation or the last phase of the assimilation proc-ıs under the control of the respective signals LSC, ASC ıd $T_{70}$ DIV. Thus, upon completion of the divide in-ruction DIV, the rounded quotient developed in the ı and I-registers has been assimilated and stored in the ·-register with the sign in flip-flop $A_{30}$ spread to the flip-op $A_{31}$ and the remainder has been discarded.

In order to obtain the final remainder which is in greement with the rounded quotient obtained in response ı the instruction DIV, the instruction for the remainder ʼhich is distinguished by the mnemonic code REM is erformed with the identical dividend and normalized ivisor. The process is the same until clock time $T_{62}$, as ħow by the flow chart of FIGURE 2. At that time the ·gn of the accumultor is determined in the same man-er as at time $T_{62}$ for the instruction DIV according to ıe function $$_1Sc=A_{31}A_{30}X_4H_{30}(\text{TEVEN}+T_{62}REMSc')$$
$$+A_{31}A_{30}X_1M_{30}'X_5X_3(TEVEN+T_{62}REMSc')$$
$$+A_{31}'M_{30}(\text{TEVEN}+T_{62}REMSc')$$
$$+A_{31}A_{30}'M_{30}'(\text{TEVEN}+T_{62}REMSc')$$
$$+A_{31}A_{30}X_3X_2X_5(\text{TEVEN}+T_{62}REMSc')$$
$$_0Sc=(A_{31}A_{30}X_4M_{30})'(A_{31}A_{30}X_1M_{30}'X_5X_3)'$$
$$(A_{31}'M_{30})'(A_{31}A_{30}'M_{30}')'(A_{31}A_{30}X_3X_2X_5)'$$
$$(T_0+\text{TEVEN})$$
$$+(A_{31}A_{30}X_4M_{30})'(A_{31}A_{30}X_1M_{30}'X_5X_3)'$$
$$(A_{31}M_{30})'(A_{31}A_{30}M_{30})'(A_{31}A_{30}X_3X_2X_5)'$$
$$T_{62}REMMc$$
$$(A_{31}M_{30})'(A_{31}A_{30}'M_{30})'(A_{31}A_{30}X_3X_2X_5)'$$
$$+A_{31}A_{30}X_5X_3X_2T_{62}REMScMc$$
$$Mc=(A_{31}A_{30}X_5X_3X_2)'(T_0+\text{TEVEN})$$
$$_1Mc=A_{31}A_{30}X_5X_3X_2\text{TEVEN}$$

As noted hereinbefore, TEVEN is the timing control ːor all even clock times $T_2$ to $T_{60}$. Thus, for the purpose of understanding the adjustment of the remainder at time $T_{63}$, the control signal TEVEN may be interpreted as the clock time $T_{60}$. At that time the remainder is shifted for the last time and the control flip-flops Sc and Mc are set for one additional arithmetic operation performed at time $T_{61}$.

It will be recalled that to determine whether the quotient should be rounded, the process of division was continued for one more arithmetic operation at time $T_{61}$ without shifting the remainder again at time $T_{62}$. Therefore, once it is determined whether the quotient should be rounded, the remainder may be adjusted by a comparison of the 31st and 32nd pair of quotient digits effectively determined by the state of the control flip-flops Sc and Mc at time $T_{62}$ and the state to which the control flip-flops Sc and Mc would have been set had the operation been continued from which the 32nd pair of quotient digits is effectively determined.

For complete understanding, reference should be made to the table for Rounding Quotient and Adjusting Remainder set forth hereinbefore. The foregoing logic for the control flip-flop Sc implements that table for adjusting the remainder in response to the timing and control term $T_{62}$ REM. The control flip-flop Mc is not altered at time $T_{62}$ since the quantity added (zero or the content of the M-register) or subtracted (the content of the M-register) at time $T_{61}$ is also to be added or subtracted at time $T_{63}$ in accordance with the aforesaid table. All redundances have been omitted in those logic equations.

The novel aspects of this improved division apparatus may be more readily understood through a study of the following example in which the contents of the A and C-registers are shown at each step together with the divisor which is represented by the function $$b_i=M_iScMc+M_i'Sc'Mc$$
$$b_i'=M_i'ScMc+M_iSc'Mc+Mc'$$

When the sign of the partial remainder is the same as the divisor, the divisor is subtracted and a pair of quotient digits 1, 1 are stored in the least significant bit positions of the Q and I-registers. When the sign of the partial remainder is not the same, the divisor is added and a pair of quotient digits 0, 0 are stored. This of course is for the example where the sign of the divisor is positive. For a negative divisor, the operations indicated are reversed and the quotient digits stored also reversed. If the sign of the partial remainder cannot be determined from an examination of the five most significant positions of the accumulator, and "add zero" operation is performed and a pair of quotient digits 0, 1 are stored in the Q and I-registers. It should be noted that the "add zero" operation has been implemented for convenience; a "do nothing" operation could have been implemented just as well, both operations being the same except that in "adding zero" the unassimilated carries present in the C-register are added, earlier than with a "do nothing" operation.

Example: $-1/64 \div 1/2 = -1/32$

| | 32 | 31 | 30 | 29 | 28 | 27 | 26 | 25 | 24 | | 30 | 29 | 28 | 27 | 26 | 25 | 24 | Sc | Mc | |
|---|---|---|---|---|---|---|---|---|---|---|---|---|---|---|---|---|---|---|---|---|
| A | 0 | 1 | 1. | 1 | 1 | 1 | 1 | 1 | 1 | Q | 0. | 0 | 0 | 0 | 0 | 0 | 0 | 1 | 0 | |
| C | | | | 0 | 0 | 0 | 0 | 0 | 0 | I | 0. | 0 | 0 | 0 | 0 | 0 | 0 | | | $T_0$ |
| A | 0 | 1 | 1. | 1 | 1 | 1 | 1 | 1 | 1 | Q | 0. | 0 | 0 | 0 | 0 | 0 | 0 | 1 | 0 | |
| C | | | | 0 | 0 | 0 | 0 | 0 | 0 | I | 0. | 0 | 0 | 0 | 0 | 0 | 0 | Add 0 | | $T_1$ |
| b | | | 0. | 0 | 0 | 0 | 0 | 0 | 0 | | | | | | | | | | | |
| A | 0 | 1 | 1. | 1 | 1 | 1 | 1 | 1 | 1 | Q | 0. | 0 | 0 | 0 | 0 | 0 | 0 | Shift | | |
| C | | | | 0 | 0 | 0 | 0 | 0 | 0 | I | 0. | 0 | 0 | 0 | 0 | 0 | 0 | | | $T_2$ |
| A | 0 | 1 | 1. | 1 | 1 | 1 | 1 | 1 | 0 | Q | 0. | 0 | 0 | 0 | 0 | 0 | 0 | 1 | 0 | |
| C | | | | 0 | 0 | 0 | 0 | 0 | 0 | I | 0. | 0 | 0 | 0 | 0 | 0 | 1 | Add 0 | | $T_3$ |
| b | | | 0. | 0 | 0 | 0 | 0 | 0 | 0 | | | | | | | | | | | |
| A | 0 | 1 | 1. | 1 | 1 | 1 | 1 | 1 | 0 | Q | 0. | 0 | 0 | 0 | 0 | 0 | 0 | Shift | | |
| C | | | | 0 | 0 | 0 | 0 | 0 | 0 | I | 0. | 0 | 0 | 0 | 0 | 0 | 1 | | | $T_4$ |

| | 32 | 31 | 30 | 29 | 28 | 27 | 26 | 25 | 24 | | 30 | 29 | 28 | 27 | 26 | 25 | 24 | | | Sc | Mc | | |
|---|---|---|---|---|---|---|---|---|---|---|---|---|---|---|---|---|---|---|---|---|---|---|---|
| A | 0 | 1 | 1. | 1 | 1 | 1 | 1 | 0 | 0 | Q | 0. | 0 | 0 | 0 | 0 | 0 | 0 | | | 1 | 0 | Add 0 | $T_5$ |
| C | | | | 0 | 0 | 0 | 0 | 0 | 0 | I | 0. | 0 | 0 | 0 | 0 | 1 | 1 | | | | | | |
| b | | | 0. | 0 | 0 | 0 | 0 | 0 | 0 | | | | | | | | | | | | | | |
| A | 0 | 1 | 1. | 1 | 1 | 1 | 1 | 0 | 0 | Q | 0. | 0 | 0 | 0 | 0 | 0 | 0 | | | | | Shift | $T_6$ |
| C | | | | 0 | 0 | 0 | 0 | 0 | 0 | I | 0. | 0 | 0 | 0 | 0 | 1 | 1 | | | | | | |
| A | 0 | 1 | 1. | 1 | 1 | 1 | 0 | 0 | 0 | Q | 0. | 0 | 0 | 0 | 0 | 0 | 0 | | | 1 | 1 | Add M | $T_7$ |
| C | | | | 0 | 0 | 0 | 0 | 0 | 0 | I | 0. | 0 | 0 | 0 | 1 | 1 | 1 | | | | | | |
| b | | | 0. | 1 | 0 | 0 | 0 | 0 | 0 | | | | | | | | | | | | | | |
| A | 0 | 0 | 0 | 0 | 1 | 1 | 0 | 0 | 0 | Q | 0 | 0 | 0 | 0 | 0 | 0 | 0 | | | | | Shift | $T_8$ |
| C | | | | 0 | 0 | 0 | 0 | 0 | 0 | I | 0 | 0 | 0 | 0 | 1 | 1 | 1 | | | | | | |
| A | 0 | 0 | 0. | 1 | 1 | 0 | 0 | 0 | 0 | Q | 0. | 0 | 0 | 0 | 0 | 0 | 0 | | | 0 | 1 | Sub M | $T_9$ |
| C | | | | 0 | 0 | 0 | 0 | 0 | 0 | I | 0. | 0 | 0 | 1 | 1 | 1 | 0 | | | | | | |
| b | | | 1. | 0 | 1 | 1 | 1 | 1 | 1 | | | | | | | | | | | | | | |
| A | 0 | 1 | 1. | 1 | 0 | 1 | 1 | 1 | 1 | Q | 0. | 0 | 0 | 0 | 0 | 0 | 0 | | | | | Shift | $T_{10}$ |
| C | | | | 1 | 0 | 0 | 0 | 0 | 1 | I | 0. | 0 | 0 | 1 | 1 | 1 | 0 | | | | | | |
| A | 0 | 0 | 0. | 0 | 1 | 1 | 1 | 1 | 0 | Q | 0. | 0 | 0 | 0 | 0 | 0 | 1 | | | 0 | 1 | Sub M | $T_{11}$ |
| C | | | | 0 | 0 | 0 | 0 | 1 | 0 | I | 0. | 0 | 1 | 1 | 1 | 0 | 1 | | | | | | |
| b | | | 1. | 0 | 1 | 1 | 1 | 1 | 1 | | | | | | | | | | | | | | |
| A | 0 | 1 | 1. | 0 | 0 | 0 | 0 | 1 | 1 | Q | 0 | 0 | 0 | 0 | 0 | 0 | 1 | | | | | Shift | $T_{12}$ |
| C | | | | 1 | 1 | 1 | 1 | 0 | 1 | I | 0 | 0 | 1 | 1 | 1 | 0 | 1 | | | | | | |
| A | 0 | 1 | 1. | 0 | 0 | 0 | 1 | 1 | 0 | Q | 0 | 0 | 0 | 0 | 0 | 1 | 1 | | | 1 | 0 | Add 0 | $T_{13}$ |
| C | | | | 1 | 1 | 1 | 0 | 1 | 0 | I | 0 | 1 | 1 | 1 | 0 | 1 | 1 | | | | | | |
| b | | | 0. | 0 | 0 | 0 | 0 | 0 | 0 | | | | | | | | | | | | | | |
| A | 0 | 1 | 1. | 1 | 1 | 1 | 1 | 0 | 0 | Q | 0 | 0 | 0 | 0 | 0 | 1 | 1 | | | | | Shift | $T_{14}$ |
| C | | | | 0 | 0 | 0 | 1 | 0 | 0 | I | 0 | 1 | 1 | 1 | 0 | 1 | 1 | | | | | | |
| A | 0 | 1 | 1. | 1 | 1 | 1 | 1 | 0 | 0 | Q | 0. | 0 | 0 | 0 | 1 | 1 | 0 | | | 0 | 1 | Sub M | $T_{61}$ |
| C | | | | 0 | 0 | 0 | 1 | 0 | 0 | I | 1. | 1 | 1 | 0 | 1 | 1 | 1 | | | | | | |
| b | | | 1. | 0 | 1 | 1 | 1 | 1 | 1 | | | | | | | | | | | | | | |
| A | 0 | 1 | 0. | 1 | 0 | 0 | 1 | 1 | 1 | | | | | | | | | | | | | I→M | $T_{62}$ |
| C | | | | 1 | 1 | 1 | 0 | 0 | 1 | | | | | | | | | | | | | | |
| A | 1 | 0 | 0. | 0 | 0 | 0 | 0 | 0 | 0 | Q | 0 | 0 | 0 | 0 | 1 | 1 | 0 | 1 | 0 | 1 | 1 | Add M Q→M | $T_{63}$ |
| C | | | | 0 | 0 | 0 | 0 | 0 | 1 | I | 1 | 0 | 1 | 0 | 1 | 1 | 1 | 1 | 0 | | | | |
| b | | | 1. | 1 | 1 | 0 | 1 | 1 | 1 | | | | | | | | | | | | | | |
| A | 1 | 1 | 1 | 1 | 1 | 0 | 1 | 1 | 0 | | | | | | | | | | | 1 | 1 | Add M | $T_{64}$ |
| C | | | | 0 | 0 | 0 | 0 | 1 | 0 | | | | | | | | | | | | | | |
| b | | | 0. | 0 | 0 | 0 | 1 | 1 | 0 | | | | | | | | | | | | | | |
| A | 1 | 1 | 1. | 1 | 1 | 0 | 0 | 1 | 0 | | | | | | | | | | | 1 | 0 | Add 0 | $T_{65}$ |
| C | | | | 0 | 0 | 1 | 1 | 0 | 0 | | | | | | | | | | | | | | |
| b | | | 0. | 0 | 0 | 0 | 0 | 0 | 0 | | | | | | | | | | | | | | |
| A | 1 | 1 | 1. | 1 | 1 | 1 | 1 | 1 | 0 | | | | | | | | | | | | | Ripple Carry | $T_{69}$ |
| C | | | | 0 | 0 | 0 | 0 | 0 | 0 | | | | | | | | | | | | | | |
| A | 1 | 1 | 1. | 1 | 1 | 1 | 1 | 1 | 0 | | | | | | | | | | | 1 | 0 | Add 0 | $T_{70}$ |
| C | | | | 0 | 0 | 0 | 0 | 0 | 0 | | | | | | | | | | | | | | |
| b | | | 0. | 0 | 0 | 0 | 0 | 0 | 0 | | | | | | | | | | | | | | |
| A | 0 | 1 | 1. | 1 | 1 | 1 | 1 | 1 | 0 | Rounded Quotient=−1/32 | | | | | | | | | | | | | |

The foregoing example will now be described with reference to the flow chart of FIGURE 2 and various tables set forth hereinbefore. After the divisor has been normalized and the dividend appropriately scaled in the accumulator, the control flip-flops *Sc* and *Mc* are set by a control signal SUC to perform an "add zero" operation. It will be recalled that the "add zero" operation is to be performed only when the sign of the dividend or partial remainder cannot be determined by examination of the indicator positions $A_{31}$ and $A_{32}$ together with the five most significant digit positions of the accumulator. Thus it is presumed that the sign of the dividend is not initially known. At time $T_0$ the sign of the accumulator is determined and the control flip-flops *Sc* and *Mc* are set for the appropriate operation if it is not an "add zero" operation.

Since the sign of the divisor stored in the flip-flop $M_{30}$ is zero, and the sign of the accumulator cannot be determined by examination of the five most significant bit positions of the accumulator at $T_0$ of the example, the control flip-flops *Sc* and *Mc* remain set forth for the "add zero" operation, which is the proper position indicated by case 13 of the table for setting the control flip-flops *Sc* and *Mc* set forth hereinbefore. At time $T_1$ the "add zero" operation is executed and at time $T_2$ the sign of the accumulator is again examined as the accumulator is shifted one bit position to the left. Since zero was added at time $T_1$, the configuration of the dividend in the accumulator has not changed at time $T_2$ and the control flip-flops *Sc* and *Mc* remain set for the "add zero" operation. At the same time $T_2$, while the A, C, Q and I-registers are being shifted one position to the left, the first pair of quotient digits 0, 1 corresponding to the "add zero" operation are entered in the least significant bit position of the Q and I-registers, that position being position 24 for this shortened problem given as an example.

At time $T_3$ the second "add zero" operation is performed and at time $T_4$ the same steps performed at time $T_2$ are repeated to store a second pair of quotient digits 0, 1 in the Q and I-registers. It should be noted that the five most significant positions of the accumulator are examined at time $T_4$ before the partial remainder has been shifted one bit position to the left. Thus it may be seen that at time $T_4$ bit positions $A_{25}$ to $A_{29}$ which are examined each contain binary 1 while the bit positions $C_{25}$ to $C_{29}$ each contain a binary 0. Under those circumstances it is known that there is not a carry into the sign position $A_{30}$ from any of the examined positions but it is not known whether a carry from a lower position, such as position 24, would ripple through to the sign position 30. It will be recalled that the absence of a carry from ıe of the five positions examined produces the comple- .ent of the signal $X_4$ or the signal for $X_4$ equal to 0 ıd the presence of at least a binary 1 to each of the sign ɔsitions in each of the positions 25 to 29 produces the ɔmplement of the signal $X_1$ or the signal for $X_1$ equal › 0.

After the partial remainder has been shifted and the ıdd zero" operation performed at time $T_5$, the accumu- :tor is again examined to determine, if possible, the sign f the partial remainder at time $T_6$. At that time it can ɘ seen that there are no carries from the five positions xamined so that the signal $X_4$ is equal to zero and there . not a binary 1 in at least one of the five positions ex- mined, namely position 25, so that the signal $X_1$ is equal ) 1. From that it can be determined that the sign of ıe accumulator is sufficiently negative so that the re- ıaining part of the accumulator not examined cannot hange the sign upon the separately stored carries being ssimilated. Therefore, the next operation to be per- ɔrmed is the addition of the divisor as indicated by case 4 of the table for setting the control flip-flops Sc and Mc.

At time $T_7$ the divisor is added to produce the first artial remainder, which upon being examined at time $T_8$ ; known to be positive so that at time $T_9$, the divisor is ubtracted. As the accumulator is shifted at time $T_8$, the air of quotient digits 0, 0 corresponding to the "add I" operation are shifted into the least significant positions f the Q and I-registers. At time $T_{10}$ when the accumu- ator is again shifted, the pair of quotient digits 1, 1 cor- esponding to the "subtract M" operation of time $T_9$ are hifted into the least significant positions of the Q and I- egisters. The operation is performed at times $T_9$ and $T_{10}$ .re repeated at times $T_{11}$ and $T_{12}$ except that at time $T_{12}$ vhen the accumulator is again examined to determine the ign of the partial remainder it is seen that the sign of the ıccumulator cannot be determined and that the next ›peration to be performed is "add zero" as indicated for :ase 13 of the table for setting the control flip-flops Sc ınd Mc.

At time $T_{13}$, the "add zero" operation is performed and ıt time $T_{14}$ the partial remainder is shifted for the last ime since only a seven-bit quotient is to be developed in his shortened problem. Accordingly, the next clock time $T_{15}$ corresponds to time $T_{61}$ of the flow chart in FIGURE !. At time $T_{61}$, the operation indicated by the sign of he remainder at time $T_{14}$ is executed. That operation is "subtract M" because the remainder at time $T_{14}$ is known to be negative due to the presence of both an $X_4$ and $X_1$ signals as indicated for case 16 of the table for setting the control flip-flops Sc and Mc.

The last pair of quotient digits 0, 1 corresponding to the "add zero" operation at time $T_{13}$ are shifted into the Q and I-registers at time $T_{14}$ but thereafter the partial re- mainder is not again shifted and the quotient digits 1, 1 corresponding to the "subtract M" operation at time $T_{61}$ are not stored in the Q and I-registers.

At time $T_{62}$ the sign of the partial remainder is again determined in order to predict the next operation which would have been performed if the process of division were to be carried out for a larger number of quotient digits. In that manner, still another pair of quotient digits 0, 0 are effectively produced but not stored in the Q and I-registers. Accordingly, two additional pair of quotient digits 1, 1 and 0, 0 are shown at time $T_{63}$ of the example outside the Q and I-registers, the vertical line representing the lower end of the Q and I-registers.

At the same time $T_{62}$, the content of the I-register is transferred to the M-register, the accumulator is cleared and the flip-flop $A_{32}$ is set equal to 1. In order to enter the contents of the M-register into the accumulator at time $T_{63}$ the control flip-flops Sc and Mc are set for an "add M" operation at time $T_{62}$. And finally, at time $T_{62}$, the decision whether to round the quotient is reached in accordance with the table for rounding the quotient set forth hereinbefore. Since the operation actually performed at time $T_{61}$ was to "subtract M" and the next operation which would have been performed based on the sign of the remainder at time $T_{62}$ is to "add M," it is known that the quotient should be rounded by adding a binary 1 in the least significant position of the accumulator in accordance with case 3 of the table for rounding the quotient. Thus the flip-flop $C_1$ is set for rounding the quotient at time $T_{62}$.

At time $T_{63}$ the contents of the M-register are added to the contents of the accumulator and the contents of the Q-register is transferred to the M-register. At time $T_{64}$, the content of the M-register is added to the content of the accumulator. The rounded quotient is then in the accumulator in an unassimilated form. The balance of the process executed at times $T_{65}$ to $T_{70}$ is comprised of the three-phase process for assimilating the carries. At the conclusion of the process for the instruction DIV, the rounded quotient equal to $-\frac{1}{32}$ is stored in the A-register with the sign properly coded in positions $A_{30}$ and $A_{31}$.

If the remainder is desired, the same process is repeated from clock times $T_0$ to $T_{61}$. At time $T_{62}$ a different procedure is followed in accordance with the flow chart of FIGURE 2. Since the quotient has been rounded it is necessary to adjust the remainder in the accumulator at time $T_{62}$ in accordance with the table for rounding the quotient and adjusting the remainder set forth hereinbefore. Since the operation performed at time $T_{61}$ was "subtract M" and the operation which would have been performed next based upon the sign of the remainder at time $T_{62}$ is "add M," the remainder is adjusted by adding the divisor at time $T_{63}$. This is accomplished by setting the control flip-flops Sc and Mc at time $T_{62}$ for the "add M" operation which is executed at time $T_{63}$. The remainder then appears in the accumulator in the unassimilated form as illustrated in the following example of adjusting the remainder from the previous example.

| | | | | | | | | | | | | |
|---|---|---|---|---|---|---|---|---|---|---|---|---|
| A | 0 | 1 | 0. | 1 | 0 | 0 | 1 | 1 | 1 | | 1 1 | |
| C | | | | 1 | 1 | 1 | 0 | 0 | 1 | | | |
| b | | | 0. | 1 | 0 | 0 | 0 | 0 | 0 | | Add M | $T_{63}$ |
| A | 0 | 1 | 1. | 1 | 1 | 1 | 1 | 1 | 0 | Unassimilated Remainder=0 | | |
| C | | | | 0 | 0 | 0 | 0 | 1 | 0 | | | |

While the principles of the invention have now been made clear in an illustrative embodiment there will be immediately obvious to those skilled in the art many modifications in structure, arrangement, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. In apparatus for performing division by a non-restoring process of alternate steps, the first being an arithmetic operation and the second being a shift of the remainder relative to the divisor to effectively divide it by two, the combination comprising, first means for performing each operation with unassimilated carries of each partial remainder stored separately for addition to the psuedo-sum digits of the partial remainder during the subsequent arithmetic operation, second means for determining the sign of each partial remainder by examination of only a most significant part of the psuedo-sum digits and corresponding unassimilated carries if possible without examining a greater part of the psuedo-sum digits and corresponding unassimilated carries, said part being sufficiently large to be able to determine the sign if the partial remainder is greater than half the divisor after it has been shifted relative to the divisor to effectively divide it by two, third means responsive to said second means for performing the next operation as a function of the sign of the divisor and the sign of the last partial remainder according to the rule to subtract the divisor if the signs of the divisor and partial remainder are alike, to add the divisor if the signs are not alike, and to effectively perform no operation if the sign of the partial remainder could not be determined by said second means, and fourth means responsive to said third means for storing a pair of quotient digits 1, 1 if the operation performed last is subtraction, a pair of quotient digits 0, 0 if the operation performed last is addition and a pair of quotient digits 0, 1 if effectively no operation was performed last, said pairs of quotient digits stored comprising the quotient in unassimilated form, each successive pair representing successively lower orders of the quotient, such that upon the group including the first digit of all pairs being added directly to the group including all the second digits of all pairs, an assimilated quotient is produced.

2. In apparatus for performing division by a nonrestoring process of alternate steps, the first being an arithmetic operation and the second being a shift of the remainder relative to the divisor to effectively divide it by two, the combination comprising, first means for performing each operation with unassimilated carries of each partial remainder stored separately for addition to the psuedo-sum digits of the partial remainder during the subsequent arithmetic operation, second means for determining the sign of each partial remainder by examination of only a most significant part of the psuedo-sum digits and corresponding unassimilated carries if possible without examining a greater part of the psuedo-sum digits and corresponding unassimilated carries, said part being sufficiently large to be able to determine the sign if the partial remainder is greater than half the divisor after it has been shifted relative to the divisor to effectively divide it by two, third means responsive to said second means for performing the next operation as a function of the sign of the divisor and the sign of the last partial remainder according to the rule to subtract the divisor if the signs of the divisor and partial remainder are alike, to add the divisor if the signs are not alike, and to effectively perform no operation if the sign of the partial remainder could not be determined by said second means, fourth means responsive to said third means for storing a pair of quotient digits 1, 1 if the operation performed last is subtraction, a pair of quotient digits 0, 0 if the operation performed last is addition and a pair of quotient digits 0, 1 if effectively no operation was performed last, said pairs of quotient digits stored comprising the quotient in unassimilated form, each successive pair representing successively lower orders of the quotient such that, upon the group including the first digit of all pairs being added directly to the group including all the second digits of all pairs, an assimilated quotient is produced, and fifth means for automatically producing an assimilated quotient by adding the group of quotient digits including the first digit of all pairs to the group of quotient digits including the second digits of all pairs.

3. In apparatus for performing division by a nonrestoring process of alternate steps, the first being an arithmetic operation and the second being a shift of the remainder relative to the divisor to effectively divide it by two, the combination comprising, first means for performing each operation with unassimilated carries stored separately for addition to psuedo-sum digits of each partial remainder during the subsequent arithmetic operation, second means for determining the sign of each partial remainder by examination of only a most significant part of the psuedo-sum digits and corresponding unassimilated carries if possible without examining a greater part of the psuedo partial remainder and corresponding unassimilated carries, said part being sufficiently large to be able to determine the sign if the partial remainder is greater than half the divisor after it has been shifted relative to the divisor to effectively divide it by two, third means responsive to said second means for performing the next operation as a function of the sign of the divisor and the sign of the last partial remainder according to the rule to subtract the divisor if the signs of the divisor and partial remainder are alike, to add the divisor if the signs are not alike, and to effectively perform no operation if the sign of the partial remainder could not be determined by said second means, fourth means responsive to said third means for storing a pair of quotient digits 1, 1 if the operation performed last is subtraction, a pair of quotient digits 0, 0 if the operation performed last is addition and a pair of quotient digits 0, 1 if effectively no operation was performed last, said pairs of quotient digits stored comprising the quotient in unassimilated form, each successive pair representing successively lower orders of the quotient, such that, upon the group including the first digit of all pairs being added directly to the group including all the second digits of all pairs, an assimilated quotient is produced, and fifth means for automatically producing a rounded assimilated quotient by adding a round-off value upon adding the group of quotient digits including the first digits of all pairs to the group of quotient digits including the second digits of all pairs.

4. In apparatus for performing division by a nonrestoring process of alternate steps, the first being an arithmetic operation and the second being a shift of the remainder relative to the divisor to effectively divide it by two, the combination comprising, first means for performing each operation with unassimilated carries of each partial remainder stored separately for addition to the psuedo-sum digits of each remainder during $n+1$ successive arithmetic operations, and to indicate but not perform the next operation after $n+1$ partial remainders have been performed, second means for determining the sign of each partial remainder by examination of only a most significant part of the psuedo-sum digits and corresponding unassimilated carries if possible without examining a greater part of the psuedo-sum digits and corresponding unassimilated carries, said part being sufficiently large to be able to determine the sign if the partial remainder is greater than half the divisor after it has been shifted relative to the divisor to effectively divide it by two, third means for storing a pair of quotient digits 1, 1 if the operation performed last is subtraction, a pair of quotient digits 0, 0 if the operation performed last is addition and a pair of quotient digits 0, 1 if effectively no operation was performed last, said pairs of quotient digits stored comprising the quotient in unassimilated form, each successive pair representing successively lower orders of the quotient, such that upon the group including all the second digits of all pairs, an assimilated quotient is produced, fourth means for rounding the quotient represented by the first $n$ pairs of unassimilated quotient digits as a function of the two additional pairs of quotient digits such that, upon the group including the first digit of all pairs being added directly to the group including all the second digits of all pairs, an assimilated quotient is produced, and fifth means for rounding the quotient represented by the first $n$ pairs of unassimilated quotient digits as a function of the two additional pairs of quotient digits.

5. In apparatus for performing division by a non-restoring process of alternate steps, the first being an arithmetic operation and the second being a shift of the remainder relative to the divisor to effectively divide it by two, the combination comprising, first means for producing $n+1$ successive partial remainders for a quotient of $n$ digits by arithmetic operations of addition or subtraction with unassimilated carries, said means including a first register for storing carry digits, a second register for storing psuedo-sum digits, and sign indicating means for storing the apparent sign of said partial remainders, second means for determining the sign of each partial remainder by examination of only a most significant part of the psuedo-sum digits and corresponding unassimilated carries if possible without examining a greater part of the psuedo-sum digits and corresponding unassimilated carries, said part being sufficiently large to be able to determine the sign if the partial remainder is greater than half the divisor after it has been shifted relative to the divisor to effectively divide it by two, third means responsive to said second means for controlling said first means to produce each successive partial remainder as a function of the true sign of the preceding partial remainder if its true sign is not determined, said third means controlling said first means to subtract the divisor if the sign of the divisor and the dividend are alike and to add the divisor if not alike in order to produce a first partial remainder, to subtract the divisor if the sign of the divisor and the preceding partial remainder are alike and to add the divisor if not alike in order to produce succeeding partial remainders, and to neither add nor subtract the divisor if the true sign of the partial remainder is not determined, and to indicate but not perform the next operation after $n+1$ partial remainders have been formed, fourth means for producing a pair of unassimilated quotient digits for each of the first $n$ operations of said third means and indicating two additional pairs for the additional operation performed and for the additional operation indicated but not performed the pairs being 0, 0 for the operation of adding the divisor, 1, 1 for the operation of subtracting the divisor, and 0, 1 for the operation of neither adding nor subtracting the divisor, said pairs representing the quotient in an unassimilated form, each succeeding pair representing an order of the quotient in decreasing order of significance as they are produced such that the assimilated quotient may be obtained by adding directly each pairs of unassimilated quotient digits together with any carry which may be propagated from the addition of pairs of unassimilated quotient digits of lower order, and fifth means for rounding the quotient represented by the first $n$ pairs of unassimilated quotient digits as a function of the two additional pairs of quotient digits.

6. In apparatus for performing division by a non-restoring process of alternate steps, the first being an arithmetic operation and the second being a shift of the remainder relative to the divisor to effectively divide it by two, the combination comprising, first means for producing $n+1$ successive partial remainders for a quotient of $n$ digits by arithmetic operations of addition or subtraction with unassimilated carries, said means including a first register for storing carry digits, a second register for storing psuedo-sum digits, and sign indicating means for storing the apparent sign of said partial remainders, second means for determining the sign of each partial remainder by examination of only a most significant part of the psuedo-sum digits and corresponding unassimilated carries if possible without examining a greater part of the psuedo-sum digits and corresponding unassimilated carries, said part being sufficiently large to be able to determine the sign if the partial remainder is greater than half the divisor after it has been shifted relative to the divisor to effectively divide it by two, third means responsive to said second means for controlling said first means to produce each successive partial remainder as a function of the true sign of the preceding partial remainder if its true sign is not determined, said third means controlling said first means to subtract the divisor if the sign of the divisor and the dividend are alike and to add the divisor if not alike in order to produce a first partial remainder, to subtract the divisor if the sign of the divisor and the preceding partial remainder are alike and to add the divisor if not alike in order to produce succeeding partial remainders, and to neither add nor subtract the divisor if the true sign of the partial remainder is not determined, and to indicate but not perform the next operation after $n+1$ partial remainders have been formed, fourth means for producing a pair of unassimilated quotient digits for each of the first $n$ operations of said third means and indicating two additional pairs for the additional operation performed and for the additional operation indicated but not performed the pairs being 0, 0 for the operation of adding the divisor, 1, 1 for the operation of subtracting the divisor, and 0, 1 for the operation of neither adding nor subtracting the divisor, said pairs representing the quotient in an unassimilated form, each succeeding pair representing an order of the quotient in decreasing order of significance as they are produced such that the assimilated quotient may be obtained by adding directly each pairs of unassimilated quotient digits together with any carry which may be propagated from the addition of pairs of unassimilated quotient digits of lower order, and fifth means for determining whether the quotient represented by the first $n$ pairs of unassimilated quotient digits is to be rounded as a function of the two additional pairs of quotient digits and for adjusting the remainder to correspond with the quotient rounded in the manner determined as a function of said additional operation performed and the additional operation indicated but not performed.

7. In apparatus for performing division by adding or subtracting a divisor from a dividend to produce a first partial remainder and adding or subtracting said divisor from said first and subsequent partial remainders to produce successive partial remainders, the successive operations of adding and subtraction being selected in accordance with the signs of said divisor and the successive signs of said dividend, first partial remainder, and subsequent partial remainders, the combination comprising, first means for producing each successive partial remainder by an arithmetic operation of addition or subtraction with unassimilated carries, said means including a first register for storing carry digits, a second register for storing psuedo-sum digits, and sign indicating means for storing the apparent sign of said partial remainders, second means for examining in succession the apparent sign of each of said partial remainders stored in said sign indicating means and together with parts of said partial remainders in said first and second registers to determine the true sign of each if, upon it being scaled for the next operation, its absolute value is equal to or greater than one half the absolute value of the divisor, third means responsive to said second means for controlling said first means to produce each successive partial remainder as a function of the true sign of the preceding partial remainder, and to produce a partial remainder equal to its preceding partial remainder if its true sign is not determined, said third means controlling said first means to subtract the divisor if the sign of the divisor and the dividend are alike and to add the divisor if not alike in order to produce a first partial remainder, to subtract the divisor if the sign of the divisor and the preceding partial remainder are alike and to add the divisor if not alike in order to produce succeeding partial remainders, and to neither add nor subtract the divisor if the true sign of the partial remainder is not determined, fourth means for scaling each partial remainder for the next operation of said first means controlled by said second means, said scaling effectively dividing the partial remainder by two relative to the scale of the divisor for each succeeding operation including the operation of neither adding nor subtracting the divisor, and fifth means for producing a pair of unassimilated quotient digits for each operation of said third means, the pairs being 0, 0 for the operation of adding the divisor, 1, 1 for the operation of subtracting the divisor, 0, 1 for the operation of neither adding nor subtracting the divisor, said pairs representing the quotient in an unassimilated form, each succeeding pair representing an order of the quotient in decreasing order of significance such that the assimilated quotient may be obtained by adding directly each pair of unassimilated quotient digits together with any carry which may be propagated from the addition of pairs of unassimilated quotient digits of lower order.

8. In apparatus for performing division by adding or subtracting a divisor from a dividend to produce a first partial remainder and adding or subtracting said divisor from said first and subsequent partial remainders to produce successive partial remainders, the successive operations of addition and subtraction being selected in accordance with the signs of said divisor and the successive signs of said dividend, first partial remainder, and subsequent partial remainders, the combination comprising, first means for producing $n+1$ successive partial remainders for a quotient of $n$ digits by arithmetic operations of addition or subtraction with unassimilated carries, said means including a first register for storing carry digits, a second register for storing psuedo-sum digits, and sign indicating means for storing the apparent sign of said partial remainders, second means for examining in succession the apparent sign of each of said partial remainders stored in said sign indicating means together with parts of said partial remainders in said first and second registers to determine the true sign of each if, upon it being scaled for the next operation, its absolute value is equal to or greater than one half the absolute value of the divisor, third means responsive to said second means for controlling said first means to produce each successive partial remainder as a function of the true sign of the preceding partial remainder, and to produce a partial remainder equal to its preceding partial remainder if its true sign is not determined, said third means controlling said first means to subtract the divisor if the sign of the divisor and the dividend are alike and to add the divisor if not alike in order to produce a first partial remainder, to subtract the divisor if the sign of the divisor and the preceding partial remainder are alike and to add the divisor if not alike in order to produce succeeding partial remainders, and to neither add nor subtract the divisor if the true sign of the partial remainder is not determined, and to indicate but not perform the next operation after $n+1$ partial remainders have been formed, fourth means for scaling each of the first $n$ partial remainders for the next operation of said first means controlled by said second means, said scaling effectively dividing each of the first $n$ partial remainders by two relative to the scale of the divisor for a succeeding operation including the operation of neither adding nor subtracting the divisor, fifth means for producing a pair of unassimilated quotient digits for each of the first $n$ operations of said third means and indicating two additional pairs for the additional operation performed and for the additional operation indicated but not performed, the pairs being 0, 0 for the operation of adding the divisor, 1, 1 for the operation of subtracting the divisor, and 0, 1 for the operation of neither adding nor subtracting the divisor, said pairs representing the quotient in an unassimilated form, each succeeding pair representing an order of the quotient in decreasing order of significance as they are produced, such that the assimilated quotient may be obtained by adding directly each pair of unassimilated quotient digits together with any carry which may be propagated from the addition of pairs of unassimilated quotient digits of lower order.

and sixth means for rounding the quotient represented by the first $n$ pairs of unassimilated quotient digits as a function of the two additional pairs of quotient digits.

9. In apparatus for performing division by adding or subtracting a divisor from a dividend to produce a first partial remainder, all negative factors being expressed in the binary form $$-2^0N_n+2^{-1}N_{n-1}+2^{-2}N_{n-2} \ldots +2^{-(n-1)}N_1$$

where $N_n$ is the sign digit equal to 0 for a positive number and equal to 1 for a negative number, and adding or subtracting said divisor from said first and subsequent partial remainders to produce successive remainders, the successive operations of addition and subtraction being selected in accordance with the sign of said divisor and, in succession, the signs of said dividend and subsequent partial remainders, the combination comprising, first means for storing said dividend and subsequent partial remainders in unassimilated carry form, said means including a first register for storing carry digits $C_{n-1}, C_{n-2} \ldots C_1$, a second register for storing psuedo-sum digits $A_{n-1}, A_{n-2} \ldots A_1$, and sign indicating means for storing the sign of the dividend and the apparent sign of subsequent partial remainders in two flip-flops $A_n$ and $A_{n+1}$, one of said flip-flops having a value of $+1$, and the other having a value of $-2$, whereby partial remainders may have a value A within the range of $-2 \leq A < 1-2^{(n-1)}$, said first means further including arithmetic means for producing each successive partial remainder by an arithmetic operation of addition or subtraction and computing the apparent sign of a given partial remainder as the algebraic sum of said sign indicating means, $2^{-1}C_{n-1}$, $a^{-1}A_{n-1}$ and the sign of the divisor $2^{-1}N_{n-1}$, second means for transforming the sign digit $-2^0N_n$ of a given dividend to a pair of sign digits $-2N_{n+1}$, $+2^0N_n$, the algebraic sum of which equals the sign digit $-2^0N_n$, upon said given dividend being stored in said first means, for storage in said two flip-flops $A_{n+1}$ and $A_n$, respectively, third means for examining the apparent sign of each of said partial remainders stored in said flip-flops $A_n$ and $A_{n+1}$, and corresponding most significant parts of said first and second registers to determine the true sign of each partial remainder if, upon it being scaled for the next operation, it has an absolute value equal to or greater than one half the absolute value of the divisor, fourth means responsive to said third means for controlling said first means to produce each successive partial remainder as a function of the true sign of the preceding partial remainder, and to produce a partial remainder equal to its preceding partial remainder if its true sign is not determined, said third means controlling said first means to subtract the divisor if the signs of the divisor and the dividend are alike and to add the divisor if said signs are not alike to produce a first partial remainder, to subtract the divisor if the sign of the divisor and the last produced partial remainder are alike and to add the divisor if said signs are not alike to produce succeeding partial remainders, and to neither add nor subtract the divisor if the true sign of the partial remainder is not determined, fifth means for scaling each partial remainder after each operation of said first means controlled by said second means, said scaling effectively dividing the partial remainder by two relative to the scale of the divisor for each succeeding operation including the operation neither adding nor subtracting the divisor, and sixth means for producing a pair of unassimilated quotient digits for each operation of said fourth means, the pairs being 0, 0 for the operation of addition 1, 1 for the operation of subtraction and 0, 1 for the operation of not neither adding nor subtracting the divisor, said pairs representing the quotient in an unassimilated form, each succeeding pairs produced representing an order of the quotient in decreasing order of significance, such that the assimilated quotient may be obtained by adding directly each pair of unassimilated quotient digits together with any carry which may be propagated from the addition of pairs of unassimilated quotient digits of lower order.

10. In apparatus for performing division by adding or subtracting a divisor from a dividend to form a first partial remainder, all negative factors being expressed in the binary form $$-2^0N_n+2^{-1}N_{n-1}+2^{-2}N_{n-2} \ldots +2^{-(n-1)}N_1$$

where $N_n$ is the sign digit equal to 0 for a positive number and equal to 1 for a negative number, and adding or substracting said divisor from said first and subsequent partial remainders to produce successive remainders, the successive operations of addition and subtraction being selected in accordance with the sign of said divisor and, in succession, the signs of said dividend and subsequent partial remainders, the combination comprising, first means for storing said dividend and subsequent partial remainders in unassimilated carry form, said means including a first register for storing carry digits $C_{n-1}$, $C_{n-2}$, . . . $C_1$, a second register for storing psuedo-sum digits $A_{n-1}$, $A_{n-2}$, and sign indicating means for storing the sign of the dividend and the apparent sign of subsequent partial remainders in two flip-flops $A_n$ and $A_{n+1}$, said flip-flop $A_n$ having a value of $+1$ and the other flip-flop $A_{n+1}$ having a value of $-2$, whereby partial remainders may have a value A within a range of $$-2 \leqslant A < 1-2^{(n-1)}$$

said first means further including arithmetic means for producing each successive partial remainder by an arithmetic operation of addition or substaraction and computing the apparent sign of a given partial remainder as the algebraic sum of said sign indication means $2^{-1}C_{n-1}$, $a^{-1}A_{n-1}$ and the sign of the divisor $2^{-1}N_{n-1}$, second means for transforming the sign digit $-2^0N_n$ of a given dividend to a pair of sign digits $2N_{+1}$, $+2^0{}_n$ for storage in said two flip-flops $A_{n+1}$ and $A_n$ respectively, the algebraic sum of said pair of sign digits being equal to the sign digit $-2^0N_n$, upon said given dividend being stored in said first means, third means for examining the apparent sign of each of said partial remainders stored in said flip-flops $A_n$ and $A_{n+1}$, and corresponding most significant parts of said first and second registers to determine the true sign of each partial remainder if, upon it being scaled for the next operation, it has an absolute value equal to or greater than one half the absolute value of the divisor, fourth means responsive to said third means for controlling said first means to produce each succesive partial remainder as a function of the true sign of the preceding partial remainder, and to produce a partial remainder equal to its preceding partial remainder if its true sign is not determined, said third means controlling said first means to substract the divisor if the signs of the divisor and the dividend are alike and to add the divisor if said signs are not alike to produce a first partial remainder, to substract the divisor if the sign of the divisor and the last produced partial remainder are alike and to add the divisor if said signs are not alike to produce succeeding partial remainders, and to neither add nor subtract the divisor if the true sign of the partial remainder is not determined, fifth means for scaling each partial remainder after each operation of said first means controlled by said second means, said scaling being effected by shifting the contents of said first and second registers one place in the direction of higher order relative to said divisor and by shifting into said sign indicating means according to the functions $$_1A_n=A_{n-1}'C_{n-1}+A_{n-1}C_{n-1}'$$
$$_0A_n=A_{n-1}'C_{n-1}'$$
$$_0A_{n+1}=A_n'A_{n-1}'C_{n-1}+A_n'A_{n-1}C_{n-1}'+A_nA_{n-1}C_{n-1}$$

and sixth means for producing a pair of unassimilated quotient digits for each operation of said fourth means, the pairs being 0, 0 for the operation of addition, 1, 1 for the operation of subtraction and 0, 1 for the operation of neither adding nor subtracting the divisor, said pairs representing the quotient in an unassimilated form, each succeeding pairs produced representing an order of the quotient in decreasing order of significance, such that the assimilated quotient may be obtained by adding directly each pair of unassimilated quotient digits together with any carry which may be propagated from the addition of pairs of unassimilated quotient digits of lower order.

11. Apparatus as defined by claim 10 including means for detecting an overflow which would occur upon scaling a given partial remainder according to the function $${}_1Ov=A_{n+1}A_n'A_{n-1}'C_{n-1}'+A_{n+1}A_n+A_{n+1}'A_{n-1}C_{n-1}$$

12. In apparatus for performing division by adding or subtracting a divisor from a dividend to form a first partial remainder, all negative factors being expressed in the binary form $$-2^0N_n+2^{-1}N_{n-1}+2^{-2}N_{n-2}\ .\ .\ .\ +2^{-(n-1)}N_1$$

where $N_n$ is the sign digit equal to 0 for a positive number and equal to 1 for a negative number, and adding or subtracting said divisor from said first and subsequent partial remainders, the successive operations of addition and subtraction being selected in accordance with the sign of said divisor and, in succession, the signs of said dividend and subsequent partial remainders, the combination comprising, first means for storing said dividend and subsequent partial remainders in unassimilated carry form, said means including a first register for storing carry digits $C_{n-1}$, $C_{n-2}$ . . . $C_1$, a second register for storing psuedo-sum digits $A_{n-1}$, $A_{n-2}$ . . . $A_1$, and sign indicating means for storing the sign of the dividend and the apparent sign of subsequent partial remainders in two flip-flops $A_n$, $A_{n+1}$ and $A_{n+2}$, said flip-flops having the respective values of +1, −2 and −4 whereby partial remainders may have a value A within a range of $-2\leqslant A<1-2^{(n-1)}$ and an overflow value outside that range, said first means further including arithmetic means for producing each successive partial remainder by an arithmetic operation of addition or subtraction and computing the apparent sign of a given partial remainder as the algebraic sum of said sign indicating means $$2^{-1}C_{n-1},\ a^{-1}A_{n-1}$$

and the sign of the divisor $2^{-1}N_{n-1}$, second means for transforming the sign digit $-2^0N_n$ of a given dividend to a pair of sign digits $2N_{n+1}$, $+2^0N_n$ the algebraic sum of which equals the sign digit $2^0N_n$ for storage in said two flip-flops $A_{n+1}$, and $A_n$, respectively, upon said given dividend being stored in said first means, third means for examining the apparent sign of each of said partial remainders stored in said flip-flops $A_n$ and $A_{n+1}$, and corresponding most significant parts of said first and second registers to determine the true sign of each partial remainder if, upon it being scaled for the next operation, it has an absolute value equal to or greater than one half the absolute value of the divisor, fourth means responsive to said third means for controlling said first means to produce each successive partial remainder as a function of the true sign of the preceding partial remainder, and to produce a partial remainder equal to its preceding partial remainder if its true sign is not determined, said third means controlling said first means to subtract the divisor if the signs of the divisor and the dividend are alike and to add the divisor if said signs are not alike to produce a first partial remainder, to subtract the divisor if the sign of the divisor and the last produced partial remainder are alike, to add the divisor if said signs are not alike, and to neither add nor subtract the divisor if the true sign of the partial remainder is not determined to produce succeeding partial remainders, fifth means for scaling each partial remainder after each operation of said first means controlled by said second means, said scaling being effected by shifting the contents of said first and second registers one place in the direction of higher order relative to said divisor and by shifting into said sign indicating means according to the functions $${}_1A_n=A_{n-1}'C_{n-1}+A_{n-1}C_{n-1}'$$
$${}_0A_n=A_{n-1}'C_{n-1}'$$
$${}_0A_{n+1}=A_n'A_{n-1}'C_{n-1}+A_n'A_{n-1}C_{n-1}'+A_nA_{n-1}C_{n-1}$$
$${}_1A_{n+2}=A_{n+1}A_n'(A_{n-1}'+C_{n-1}')$$

and sixth means for producing a pair of unassimilated quotient digits for each operation of said fourth means, the pairs being 0, 0 for the operation of addition, 1, 1 for the operation of subtraction and 0, 1 for the operation of subtraction and 0.1 for the operation of neither adding nor subtracting the divisor, said pairs representing the quotient in an unassimilated form, each succeeding pair produced representing an order of the quotient in decreasing order of significance such that the assimilated quotient may be obtained by adding directly each pair of unassimilated quotient digits together with any carry which may be propagated from the addition of pairs of unassimilated quotient digits of lower order.

13. Apparatus as defined by claim 12 including means for detecting an overflow which would occur upon scaling a given partial remainder according to the function $${}_1Ov=A_{n+2}+A_{n+1}A_n'A_{n-1}'C_{n-1}'+A_{n+1}A_n+A_{n+1}'A_{n-1}C_{n-1}$$

14. Apparatus as defined by claim 12 including means for detecting an overflow which occurs upon producing a given partial remainder if the range $-2\leqslant A<1-2^{(n-1)}$ is exceeded.

15. In apparatus for performing division by adding or subtracting a divisor from a dividend to form a first partial remainder and adding or subtracting said divisor from said first and subsequent partial remainders to form successive partial remainders, the successive operations of addition and subtraction being selected in accordance with the signs of said divisor and the successive signs of said dividend, first partial remainder, and subsequent partial remainders, the combination comprising, first means for producing $n+1$ successive partial remainders for a quotient of $n$ digits by arithmetic operations of addition or subtraction with unassimilated carries, said means including a first register for storing carry digits, a second register for storing psuedo-sum digits, and sign indicating means for storing the apparent sign of said partial remainders, second means for examining in succession the apparent sign of each of said partial remainders stored in said sign indicating means together with parts of said partial remainders in said first and second registers to determine the true sign of each if, upon it being scaled for the next operation, its absolute value is equal to or greater than one half the absolute value of the divisor, third means responsive to said second means for controlling said first means to produce each successive partial remainder as a function of the true sign of the preceding partial remainder, and to produce a partial remainder equal to its preceding partial remainder if its true sign is not determined, said third means controlling said first means to subtract the divisor if the sign of the divisor and the dividend are alike and to add the divisor if not alike in order to produce a first partial remainder, to subtract the divisor if the sign of the divisor and the preceding partial remainder are alike and to add the divisor if not alike in order to produce succeeding partial remainders, and to neither add nor subtract the divisor if the true sign of the dividend or a subsequent partial remainder is not determined, and to indicate but not perform the next operation after $n+1$ partial remainders have been formed, fourth means for scaling each of the first $n$ partial remainders for the next operation of said first means controlled by said second means, said scaling effectively dividing each of the first $n$ partial remainders by two relative to the scale of the divisor for a succeeding operation including the operation of neither adding nor subtracting the divisor, fifth means for producing a pair of unassimilated quotient digits for each of the first $n$ operations of said third means and indicating two additional pairs for the additional operation performed and for the additional operation indicated but not performed, the pairs being 0, 0 for the operation of adding the divisor, 1, 1 for the operation of subtracting the divisor, and 0, 1 for the operation of neither adding nor subtracting the divisor, said pairs representing the quotient in an unassimilated form, each succeeding pair representing an order of the quotient in decreasing order of significance as they are produced, such that the assimilated quotient may be obtained by adding directly each pair of unassimilated quotient digits together with any carry which may be propagated from the addition of pairs of unassimilated quotient digits of lower order, and sixth means for determining whether the quotient represented by the first $n$ pairs of unassimilated quotient digits is to be rounded as a function of the two additional pairs of quotient digits and for adjusting the remainder to correspond with the quotient rounded in the manner determined as a function of said additional operation performed and the additional operation indicated but not performed.

No references cited.

MALCOLM A. MORRISON, *Primary Examiner.*

V. SIBER, *Assistant Examiner.*